US012360271B2

(12) United States Patent
Bekara

(10) Patent No.: US 12,360,271 B2
(45) Date of Patent: Jul. 15, 2025

(54) METHODS AND SYSTEMS FOR GENERATING AN IMAGE OF A SUBTERRANEAN FORMATION BASED ON LOW FREQUENCY RECONSTRUCTED SEISMIC DATA

(71) Applicant: PGS Geophysical AS, Oslo (NO)

(72) Inventor: Maiza Bekara, Kingston Upon Thames (GB)

(73) Assignee: PGS Geophysical AS, Oslo (NO)

( * ) Notice: Subject to any disclaimer, the term of this patent is extended or adjusted under 35 U.S.C. 154(b) by 306 days.

(21) Appl. No.: 17/728,718

(22) Filed: Apr. 25, 2022

(65) Prior Publication Data

US 2022/0373703 A1 Nov. 24, 2022

Related U.S. Application Data

(60) Provisional application No. 63/183,367, filed on May 3, 2021.

(51) Int. Cl.
*G01V 1/30* (2006.01)
*G01V 1/32* (2006.01)
(Continued)

(52) U.S. Cl.
CPC ............. *G01V 1/301* (2013.01); *G01V 1/32* (2013.01); *G01V 1/34* (2013.01); *G01V 1/3808* (2013.01);
(Continued)

(58) Field of Classification Search
CPC . G01V 1/301; G01V 1/32; G01V 1/34; G01V 1/3808; G01V 1/3843; G01V 20/00;
(Continued)

(56) References Cited

U.S. PATENT DOCUMENTS 10,224,900 B2 * 3/2019 Poole ................. G01V 20/00
11,035,968 B2 * 6/2021 Li ...................... G01V 1/3808
(Continued)

FOREIGN PATENT DOCUMENTS

CN 106291661 A 1/2017
WO 2016154411 A1 9/2016

OTHER PUBLICATIONS

Bianchin et al. (Acoustic impedance estimation from combined harmonic reconstruction and interval velocity, 2019, Geophysics) (Year: 2019).*

(Continued)

*Primary Examiner* — Mohammad K Islam

(57) ABSTRACT

This disclosure presents processes and systems for generating an image of a subterranean formation from seismic data recorded in a seismic survey of the subterranean formation. The seismic data is contaminated with low frequency noise in a low frequency band. Processes and systems reconstruct seismic data in the low frequency band of the seismic data to obtain low frequency reconstructed seismic data that is free of the low frequency noise. The low frequency reconstructed seismic data is used to construct a velocity model of the subterranean formation. The velocity model and the low frequency reconstructed seismic data are used to generate an image of the subterranean formation that reveals structures of the subterranean formation without contamination from the low frequency noise.

23 Claims, 32 Drawing Sheets

(51) Int. Cl.
*G01V 1/34* (2006.01)
*G01V 1/38* (2006.01)
*G01V 20/00* (2024.01)

(52) U.S. Cl.
CPC ............ *G01V 1/3843* (2013.01); *G01V 20/00* (2024.01); *G01V 2210/65* (2013.01); *G01V 2210/74* (2013.01)

(58) Field of Classification Search
CPC .......... G01V 2210/65; G01V 2210/74; G01V 2210/622; G01V 1/364; G01V 1/368; G01V 1/38; G01V 2210/21; G01V 2210/324; G01V 1/36; G01V 2210/3246; G01V 1/04; G01V 1/135; G01V 1/188; G01V 1/325; G01V 1/3826; G01V 2210/1293; G01V 2210/1423; G01V 2210/32; G01V 2210/3242; G01V 2210/3248; G01V 2210/34; G01V 1/306; G01V 1/307; G01V 1/345; G01V 1/50; G01V 2210/6169; E21B 44/00
See application file for complete search history.

(56) References Cited

U.S. PATENT DOCUMENTS

| | | | | |
|---|---|---|---|---|
| 2011/0103182 A1* | 5/2011 | Martin | .................... | G01V 1/364 367/24 |
| 2012/0081999 A1* | 4/2012 | Halliday | .................. | G01V 1/28 367/24 |
| 2012/0224454 A1* | 9/2012 | Soubaras | ............... | G01V 1/186 367/17 |
| 2015/0346368 A1* | 12/2015 | Dellinger | ............... | G01V 1/345 367/7 |
| 2021/0132242 A1* | 5/2021 | Sallas | .................... | G01V 1/155 |
| 2021/0223424 A1* | 7/2021 | Valensi | .................. | G01V 1/303 |
| 2021/0318458 A1* | 10/2021 | Baumstein | ............... | G01V 1/36 |

OTHER PUBLICATIONS

Chen et al. (Application of Envelope in Salt Structure Velocity Building: From Objective Function Construction to the Full-Band Seismic Data Reconstruction, IEEE,2020). (Year: 2020).*

Mostafa et al. (Multistep autoregressive reconstruction of seismic records, 2007, Geophysics) (Year: 2007).*

Multistep autoregressive reconstruction of seismic records Mostafa Naghizadeh1 and Mauricio D. Sacchi1 (Year: 2007).*

Oleg Ovcharenko, Vladimir Kazei, Daniel Peter, and Tariq Alkhalifah. (2017). Neural network based low-frequency data extrapolation. 3 pages.

Scott Keating and Kris Innanen. CREWES Research Report—vol. 27 (2015). Extrapolation of low frequencies and application to physical modeling data. 14 pages.

Oleg Ovcharenko, Vladimir Kazei, Mahesh Kalita, and Daniel Peter. (2019). Deep learning for low-frequency extrapolation from multi-offset seismic data. 54 pages.

Hongyu Sun and Laurent Demanet. (2018). Low frequency extrapolation with deep learning. 5 pages.

* cited by examiner

US 12,360,271 B2

METHODS AND SYSTEMS FOR GENERATING AN IMAGE OF A SUBTERRANEAN FORMATION BASED ON LOW FREQUENCY RECONSTRUCTED SEISMIC DATA

CROSS-REFERENCE TO RELATED APPLICATION

This application claims the benefit of Provisional Application 63/183,367, filed May 3, 2021, which application is hereby incorporated by reference entirely as if fully set forth herein.

BACKGROUND

A seismic survey is a non-invasive way of gathering information about the structure and characteristics of geological structures located within a subterranean formation. A typical seismic survey is conducted by deploying seismic sources that generate seismic waves and an array of receivers above the subterranean formation. On land, the receivers are geophones and a seismic source may be an explosive buried in a shot hole, a heavy weight that is slammed against the formation surface, or a vibrating metal plate located on the formation surface. In a marine environment, a seismic survey is performed with one or more survey vessels that tow one or more seismic sources and streamers that contain numerous regularly spaced apart receivers through a body of water above a subterranean formation. Some marine surveys can use receivers located on or near the ocean floor, such as ocean-bottom nodes or ocean-bottom cables, in addition to or instead of towed streamers. The seismic sources may be an array of airguns or marine vibrators that are activated in the body of water and the receivers may be geophones or a combination of geophones and particle motion sensors. Whether a seismic survey is conducted on land or at sea, a seismic source produces acoustic energy in the form of an expanding acoustic wavefield that spreads out in all directions within the subterranean formation. At each interface between different types of liquid, rock, and sediment, a portion of the wavefield is refracted and transmitted downward while another portion is reflected upward toward the formation surface. The seismic receivers measure portions of the wavefield reflected upward from the formation and record the measured wavefield as seismic data in recording equipment. The seismic data contains information about the structure and properties of the layers and features within the subterranean formation. However, because seismic sources and receivers have almost no directional tuning capabilities, the reflected wavefields can arrive at the receivers from many different directions and contain noise that makes the raw seismic data recorded by the receivers impossible to interpret. As a result, seismology companies have invested heavily in the development of seismic data processing techniques to aid geophysicists and geologists with extracting geologic structural information from the seismic data. In particular, the seismic data is processed to generate images and models that reveal the cross-sectional structure and composition of the various layers and features within the subterranean formation. These images and models are used by geoscientists and geologists to identify potential hydrocarbon reservoirs that may be suitable for oil and gas extraction and to monitor oil and gas levels in existing hydrocarbon reservoirs that are under production.

DETAILED DESCRIPTION

Figure 1A:
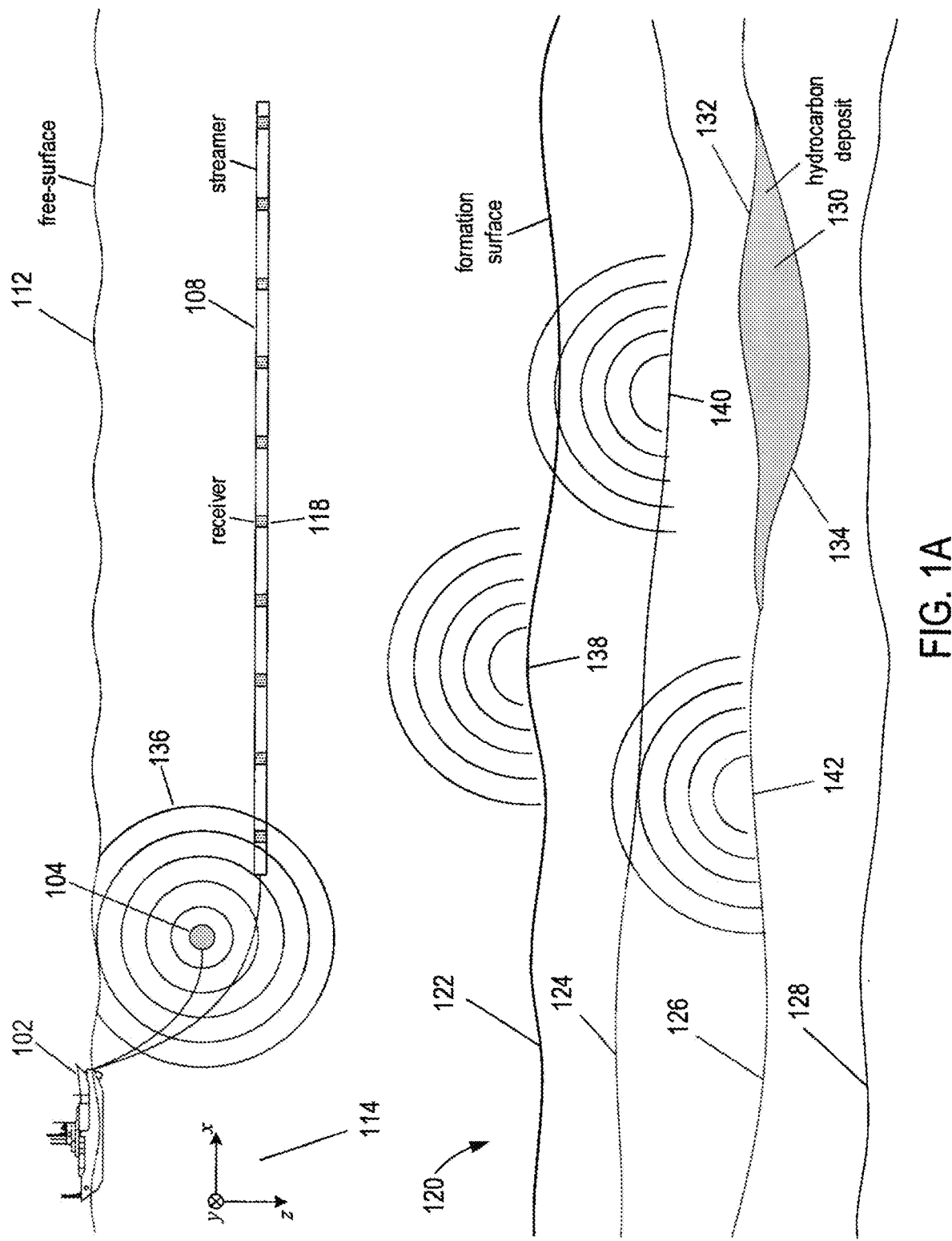
FIGS. 1A-1B show side-elevation and top views of an example marine seismic data acquisition system.

Seismic imaging techniques convert raw seismic data into seismic images that provide visual representations of complex geophysical structures within the subterranean formation. Seismic imaging techniques employ wave equations that characterize propagation of acoustic waves in a subterranean formation based on a velocity model of the subterranean formation. The resolution and accuracy of a resulting seismic image depends in large part on the resolution and accuracy of the velocity model that is used in seismic imaging. A velocity model is a cross-sectional map, or image, of the seismic velocities associated with layers of different material layers of the subterranean formation. The velocity model is also used to identify the composition of the layers and features revealed in the corresponding seismic image. For example, oil and natural gas reservoirs are typically found in layers of sandstone, clastic rocks, and carbonates, such as limestones. These layers have associated seismic velocities that are used to distinguish these layers from other layers in a seismic image of a subterranean formation. Geoscientists in the oil, gas, and mining industry rely on seismic images to reveal the complex geological structure of a subterranean formation and use associated velocity models of the subterranean formation to understand the composition of the geological structures, and in particular, identify the structures that potentially contain mineral formations and oil and natural gas reservoirs. Without accurate seismic images and velocity models of subterranean formations, geoscientists would have to resort to randomly drilling test wells in the hopes of finding a mineral deposit or a reservoir of oil and natural gas.

Seismic data recorded in a seismic survey of a subterranean formation consists of signal and noise components. The signal component, also called the signal, is ideally separated from the noise component. The signal contains information about the geological structure of the subterranean formation and is used to construct a velocity model and compute a seismic image of the subterranean formation. The noise component may be any recorded energy that interferes with, or distorts, the desired signal. The low frequency portion of the signal is particularly important for obtaining an accurate, high-resolution velocity model of the subterranean formation and for imaging deep geological structures. However, low frequency noise contamination (e.g., frequencies below about 10-15 Hz) is particularly challenging to separate from the signal and even small amounts of low frequency noise that remains in the seismic data contaminates the velocity model and leaks into the final image, reducing image resolution of subsurface layers and delineation of reservoir boundaries.

Various techniques have been developed to reduce the adverse effects of low frequency noise during the recording of seismic data. In marine surveys, these techniques include replacing certain conventional airguns of sources with larger volume airguns to increase the low frequency signal-to-noise content of the recorded seismic data. Although large volume airguns increase the signal-to-noise ratio in recorded seismic data, which improves the separation of the signal from the noise, low frequency noise contamination persists in seismic images. However, environmental regulations limit the amount of acoustic energy that can be created by airguns. Other techniques include towing streamers at depths greater than the typical streamer-depth range of about 7-10 meters below the water surface. However, recording seismic data at depths below about 10 meters requires a substantial increase in the downward force applied to the front of the streamers, which magnifies low frequency streamer vibration noise recorded by particle motion sensors. Low frequency streamer vibration noise is strongest near the front ends of the streamers where tension created by forcing the streamers to greater depths is greatest.

Various low frequency denoising techniques have been developed to attenuate the low frequency noise in recorded seismic data. However, conventional low frequency noise attenuation techniques depend on user parameter adjustments, which are error-prone, inaccurate, and time-consuming. In actual seismic data recorded in a seismic survey, the low frequency noise is often so large that traditional denoising techniques fail to achieve satisfactory noise reduction. Rather than using denoising techniques to attenuate low frequency noise others have developed techniques for reconstructing low frequency signal of seismic data to improve the result of acoustic impedance inversion from post-stack seismic data. Walker and Ulrych used autoregressive modelling to fill-in the low frequencies portion of the seismic data based on the assumption that seismic data in the time domain is sparse (i.e., the seismic data contains few non-zero or non-small values). (Walker, C., and Ulrych, T. J. *Autoregressive recovery of the acoustic impedance* Geophysics, 48, pp. 1338-1350 (1983)) It was not until the emergence of full-waveform inversion ("FWI") as a standard tool for constructing velocity models that work on low frequency reconstruction became of interest again. Wu. Luo, and Wu used a slow varying envelope of seismic traces in conjunction with the FWI formulation to estimate the low wavenumbers of the velocity model. (Wu, R. S., Luo, J., and Wu, B. *Seismic envelope inversion and modulation signal model* Geophysics, 79 WA13-WA24 (2014)) Li and Demanet proposed to decompose the data into frequency-dependent amplitude and phase atoms and then assumed respectively a linear and constant extrapolation model for the low frequencies. (Li. Y. E., and Demanet, L. *Full-waveform inversion with extrapolated low-frequency data*. Geophysics, 81. R339-R348 (2016).) Wang and Herrmann inverted the low frequencies by minimizing an $L_1$ cost function on the traces in the time domain with a total-variation regularization that accounts for spatial correlation between traces. (Wang, R., and Herrmann, F. *Frequency down extrapolation with v norm minimization*. pp. 1380-1384, SEG Expanded Abstracts (2016)).

In recent years, machine learning ("ML") has been employed to reconstruct the low frequency signal of seismic data, such as work by Oleg Ovcharenko, Vladimir Kazei, Mahesh Kalita, Daniel Peter, and Tariq Alkhalifa *Deep learning for low-frequency extrapolation from multioffset seismic data*. Geophysics Volume 84. Issue 6; and Sun, H., and Demanet, L. *Deep Learning for Low Frequency Extrapolation of Multicomponent Data in Elastic FWI*. IEEE Transactions on Geoscience and Remote Sensing (2021). These contributions differ mainly in the type of neural network architecture used in the learning process but share one common deficiency. Synthetic data with reliable low frequency signal are generated, using fine-difference modeling, and the high frequency signal is used as an input to train the network to predict the low frequency signal. Machine learning is practical as long as generalization of the neural network is robust. The validation data examples using this technology were predominately synthetic and generated under similar geology and acquisition parameters to the dataset used in the training process. However, a field deployment of this technology on real data acquired in an actual seismic survey would require constant re-training of a neural network for every new project to improve the robustness, which makes construction of the network expensive and biases FWI results toward a velocity field used in generating the training data.

As an alternative to the traditional denoising techniques and traditional methods of low frequency reconstruction, this disclosure presents processes and systems for reconstructing the low frequency signal of seismic data from the higher frequency signal of the seismic data where the signal-to-noise ratio is much better. The resulting seismic data is called low frequency reconstructed seismic data. This approach to reconstructing the low frequency signal of seismic data from the higher frequency signal of the seismic data has two advantages over conventional low frequency denoising approaches. Conventional denoising techniques attenuate both the low frequency noise and the desired signal. The low frequency signal is very important in velocity model building processes, such as FWI, to obtain high-resolution velocity models of the subsurface. Processes and systems described herein also differ from the work of Walker and Ulrych for the following reasons. First, the processes and systems perform reconstruction in local windows in the time-space domain rather than on the entire record of seismic data to adapt to the non-stationarity of the seismic data and to satisfy the assumption of sparsity. Second, the reconstruction is not performed in the frequency domain of the original seismic data. In other words, reconstruction is not performed in the frequency-space domain obtained by applying Fourier transforms to the input data but is instead performed after transforming the seismic data from the time-space domain to an intermediate domain, such as the frequency-slowness domain, the frequency-velocity domain, or the frequency-wavenumber domain. The motivation for this transformation is to enforce the sparsity assumption, to include the spatial correlation in the data, and to ensure the constraint of the signal cone of the wavefield (i.e., to include the fact that the data in 2D and 3D images are not ordinary images but are seismic images). Third, the reconstruction is performed in a stepwise manner. For example, a frequency sample is reconstructed each time with a re-estimation of an autoregressive recursion model, which offers some protection against deviation of the model from a linear harmonic assumption.

Marine Seismic Surveying

Figure 1B:
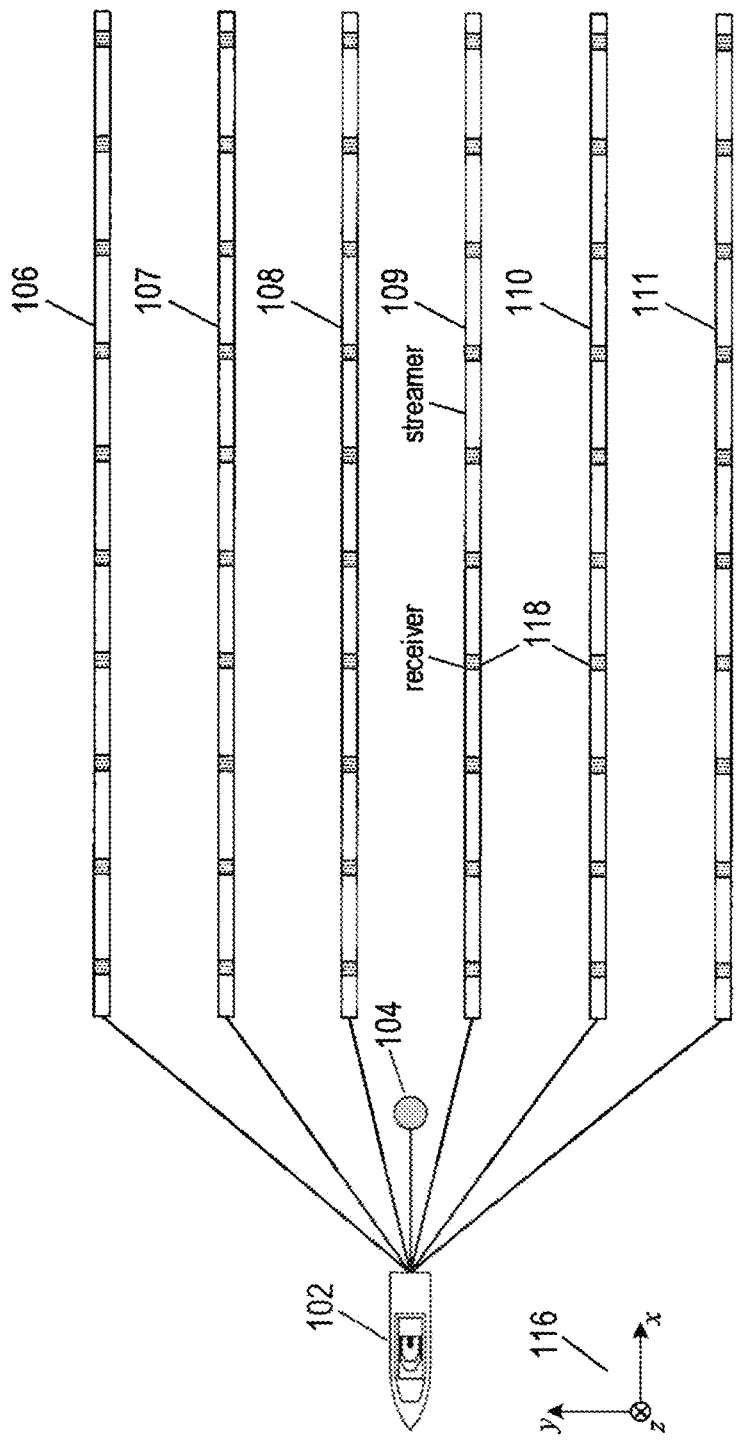

FIGS. 1A-1B show a side elevation view and a top view, respectively, of an example marine seismic data acquisition system comprising an exploration seismology survey vessel 102 and a seismic source 104. A seismic data acquisition system is not limited to one source as shown in FIGS. 1A-1B. In practice, the number of sources can range from as few as a single source towed by a survey vessel to as many as six or more sources towed by different survey vessels. The body of water can be, for example, an ocean, a sea, a lake, a river, or any portion thereof. In this example, the survey vessel 102 tows six streamers 106-111 located below the free surface of the body of water. Each streamer is attached at one end to the survey vessel 102 via a streamer-data-transmission cable. The illustrated streamers 106-111 ideally form a planar horizontal seismic data acquisition surface of the marine seismic data acquisition system with respect to the free surface 112 of the body of water. However, in practice, the streamers may be smoothly varying due to active sea currents and weather conditions. A seismic data acquisition surface is not limited to a planar horizontal orientation with respect to the free surface 112. The seismic data acquisition surface may be angled with respect to the free surface 112 or one or more of the streamers may be towed at different depths. A seismic data acquisition surface is not limited to six streamers as shown in FIG. 1B. In practice, the number of streamers used to form a seismic data acquisition surface can range from as few as one streamer to as many as 20 or more streamers.

FIG. 1A includes an xz-plane 114, and FIG. 1B includes an xy-plane 116, of the same Cartesian coordinate system having three orthogonal, spatial coordinate axes labeled x, y, and z. The coordinate system specifies orientations and coordinate locations within the body of water. The x-direction specifies the position of a point in a direction parallel to the length of the streamers or in the direction the survey vessel is traveling and is referred to as the "inline" direction. They-direction specifies the position of a point in a direction perpendicular to the x-axis and substantially parallel to the free surface 112 and is referred to as the "crossline" direction. The z-direction, also referred to as the "depth" direction, specifies the position of a point perpendicular to the xy-plane (i.e., perpendicular to the free surface 112) with the positive z-direction pointing downward away from the free surface 112.

The streamers 106-111 are long cables containing power and data-transmission lines that connect receivers represented by shaded rectangles, such as receiver 118, spaced apart along the length of each streamer to seismic data acquisition equipment, computers, and data storage devices located onboard the survey vessel 102. Streamer depth below the free surface 112 can be estimated at various locations along the streamers using depth-measuring devices attached to the streamers. For example, depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

In FIG. 1A, curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by processing the seismic data collected during a marine seismic survey. As the survey vessel 102 moves over the subterranean formation 120, the seismic source 104 produces acoustic energy that spreads out in all directions away from the seismic source 104. For the sake of simplicity, FIG. 1A shows acoustic energy expanding outward from the seismic source 104 as a pressure wavefield 136 represented by semicircles of increasing radius centered at the vibrational source 104. The outwardly expanding wavefronts from the source may be spherical but are shown in vertical plane cross-section in FIG. 1A. The outward and downward expanding portion of the pressure wavefield 136 is called the "source wavefield" and any portion of the pressure wavefield 136 reflected downward from the free-surface 112 is called the "ghost source wavefield." The source wavefields eventually reach the formation surface 122 of the subterranean formation 120, at which point the wavefields may be partially reflected from the formation surface 122 and partially refracted downward into the subterranean formation 120, becoming elastic waves within the subterranean formation 120. In the body of water, the source wavefield primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118. As shown in FIG. 1A, waves of significant amplitude may be generally reflected from points on or close to the formation surface 122, such as point 138, and from points on or very close to interfaces in the subterranean formation 120, such as points 140 and 142.

The waves comprising the reflected wavefield may be generally reflected at different times within a range of times following the source wavefield. A point on the formation surface 122, such as the point 144, may receive a pressure disturbance from the source wavefield more quickly than a point within the subterranean formation 120, such as points 146 and 148. Similarly, a point on the formation surface 122 directly beneath the vibrational source 104 may receive the pressure disturbance sooner than a more distant-lying point on the formation surface 122. Thus, the times at which waves are reflected from various points within the subterranean formation 120 may be related to the distance, in three-dimensional space, of the points from the activated source.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

The seismic source 104 may comprise multiple airguns. The volumes of the air guns may be selected to generate source wavefields over a broad range of frequencies with large volume airguns generating source wavefields with a low fundamental frequency, small volume airguns generating source wavefields with a higher fundamental frequency, and medium volume airguns generating source wavefields with a fundamental frequency in between the low and high fundamental frequency.

Figure 2:
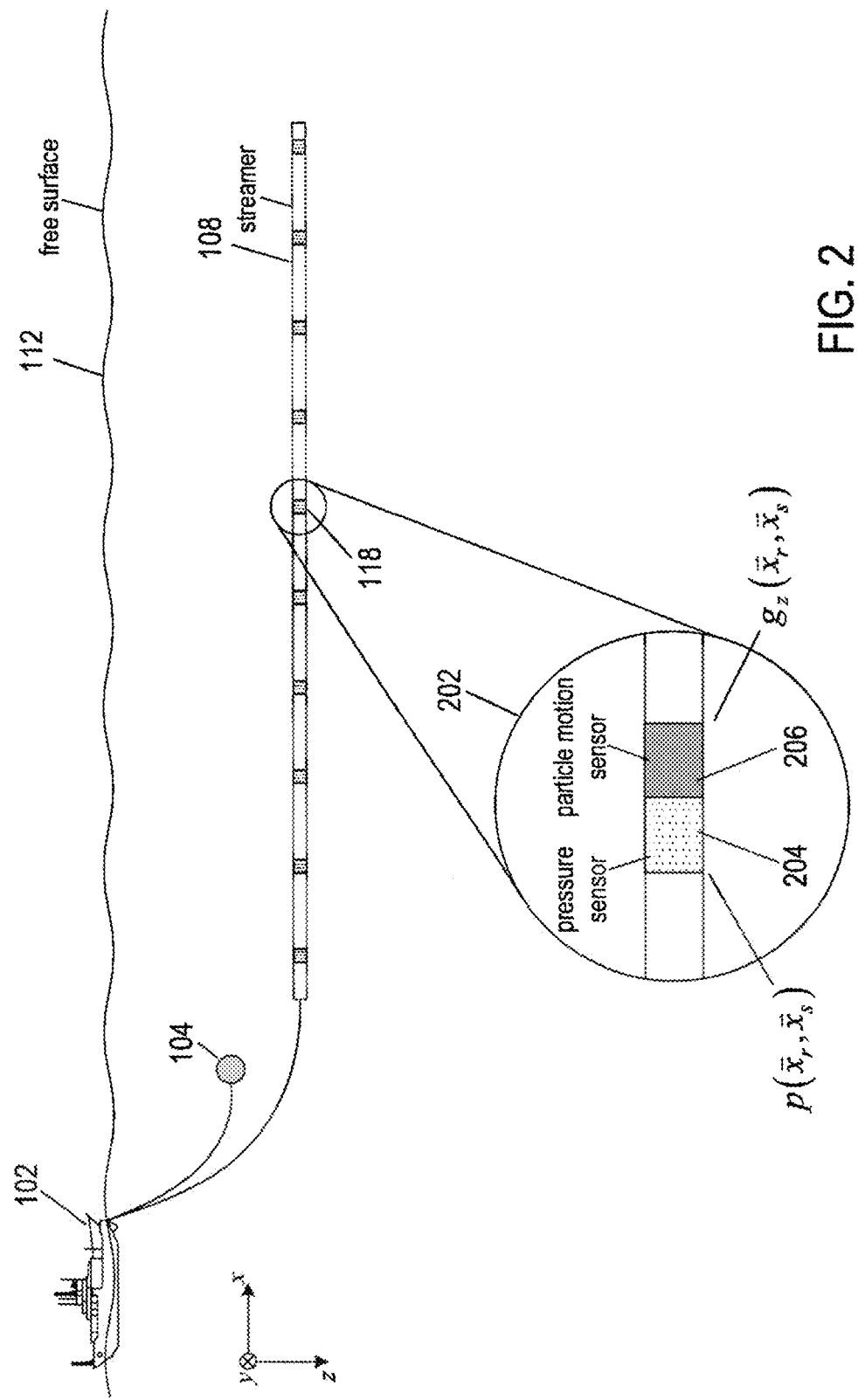
FIG. 2 shows a side-elevation view of an example marine seismic data acquisition system and a magnified view of a receiver.

Each receiver 118 may be a multicomponent sensor including particle motion sensors and a pressure sensor. The pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system and a magnified view 202 of the receiver 118. In this example, the magnified view 202 reveals that the receiver 118 is a multicomponent sensor comprising a pressure sensor 204 and a particle motion sensor 206. The pressure sensor may be, for example, a hydrophone. Each pressure sensor is a non-directional sensor that measures changes in a hydrostatic pressure Text wavefield over time to produce pressure wavefield data denoted by $p(\vec{x}_r, \vec{x}_s, t)$, where t represents time, and $\vec{x}_r$ represents the Cartesian coordinates $(x_r, y_r, z_r)$ of a receiver, particle motion sensors are directional sensors that are responsive to water motion in a particular direction. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g_{\vec{n}}(\vec{x}_r, \vec{x}_s, t)$, where the vector $\vec{n}$ represents the direction along which particle displacement is measured. A particle motion sensor that measures particle velocity (i.e., particle velocity sensor) generates particle velocity wavefield data denoted by $v_{\vec{n}}(\vec{x}_r, \vec{x}_s, t)$. A particle motion sensor that measures particle acceleration (i.e., accelerometer) generates particle acceleration data denoted by $ac_{\vec{n}}(\vec{x}_r, \vec{x}_s, t)$. The data generated by one type of particle motion sensor may be converted to another type. For example, particle displacement data may be differentiated to obtain particle velocity wavefield data, and particle acceleration data may be integrated to obtain the particle velocity wavefield data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n} = (0,0,z)$) in which case $g_z(\vec{x}_r, \vec{x}_s, t)$ is called vertical wavefield displacement data, $v_z(\vec{x}_r, \vec{x}_s, t)$ is called vertical velocity wavefield, and $ac_z(\vec{x}_r, \vec{x}_s, t)$ is called vertical acceleration wavefield. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, \vec{x}_s, t)$, each receiver may include a particle motion sensor that measures the wavefield in the inline direction to obtain the inline velocity wavefield, $v_x(\vec{x}_r, \vec{x}_s, t)$, and a particle motion sensor that measures the wavefield in the crossline direction to obtain the crossline velocity wavefield, $v_y(\vec{x}_r, \vec{x}_s, t)$. In certain implementations, the receivers may be only pressure sensors, and in other implementations, the receivers may be only particle motion sensors. The three orthogonal velocity wavefields form a velocity wavefield vector $\vec{v} = (v_x, v_y, v_z)$.

The streamers 106-111 and the survey vessel 102 may include sensing electronics and data-processing facilities that allow seismic data generated by each receiver to be correlated with the time each airgun is activated, absolute positions on the free surface 112, and absolute three-dimensional positions with respect to an arbitrary three-dimensional coordinate system. The pressure wavefield and particle motion wavefield may be stored at the receiver and/or are sent along the streamers and data transmission cables to the survey vessel 102, where the data may be stored electronically, magnetically, or optically on data-storage devices located onboard the survey vessel 102 and/or transmitted onshore to data-storage devices located in a seismic data-processing facility.

Each pressure sensor and particle motion sensor includes an analog-to-digital converter that converts time-dependent analog signals into discrete time series data that consists of consecutively measured values called "amplitudes" separated in time by a sample rate. The time-series data generated by a pressure sensor or a particle motion sensor is called a "seismic trace," or simply a "trace," which may consist of thousands of samples recorded at a typical sample rate of about 1 to 5 samples per millisecond. A trace includes a recording of a subterranean formation response to acoustic energy that passes from an activated source, into the subterranean formation where a portion of the acoustic energy is reflected and detected by a sensor as described above. Each trace records variations in time-dependent amplitudes that correspond to fluctuations in acoustic energy of the wavefield measured by the sensor. In general, each trace is an ordered sequence of discrete spatial and time-dependent pressure or motion sensor amplitudes denoted by:

$$d(\vec{x}_r, \vec{x}_s, t) = [a(\vec{x}_r, \vec{x}_s, t_n)]_{n=0}^{N-1} \quad (1)$$

where
d represents a trace of pressure data p, particle displacement data g, particle velocity data v, or a particle acceleration data ac;
a represents an amplitude of pressure, particle displacement, particle velocity, or particle acceleration data at the time sample;
$t_n$ is the n-th sample time; and
N is the number of time samples in the trace.

The coordinate location $\vec{x}_r$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and source locations vary with time and may also be denoted by $\vec{x}_r = \vec{x}_r(t) = (x_r(t), y_r(t), z_r(t))$ and $\vec{x}_s = \vec{x}_s(t) = (x_s(t), y_s(t), z_s(t))$. Each trace also includes a trace header not represented in Equation (1) that identifies the specific receiver that generated the trace, receiver, and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather, and a collection of traces sorted into the common-receiver domain are called a common-receiver gather. The portion of the acoustic signal reflected into the body of water from the subterranean formation and travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 3A:
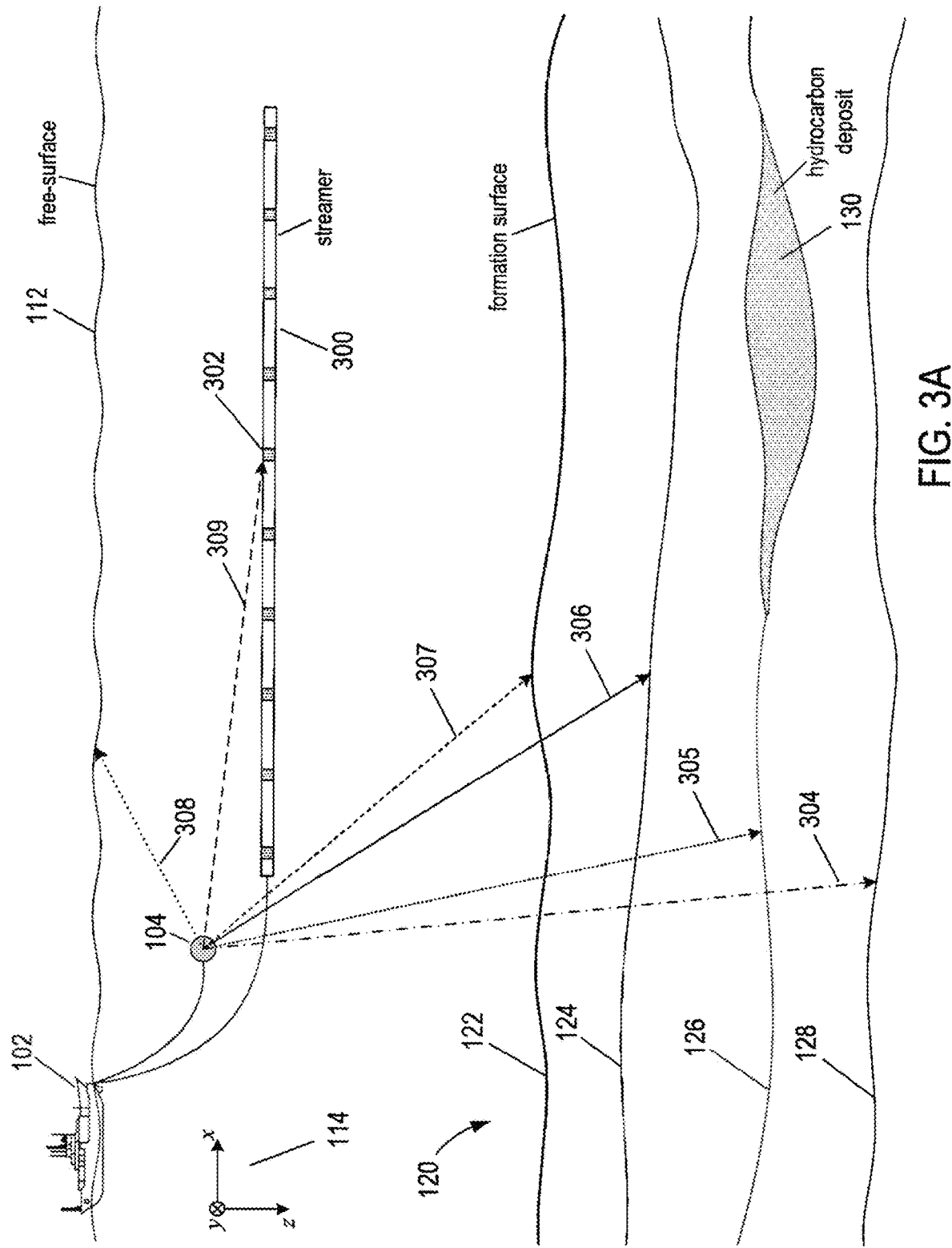
FIGS. 3A-3C show snapshots of different ways in which acoustic energy emitted from a source reverberates between a free surface and a subterranean formation before reaching a receiver.
Figure 3B:
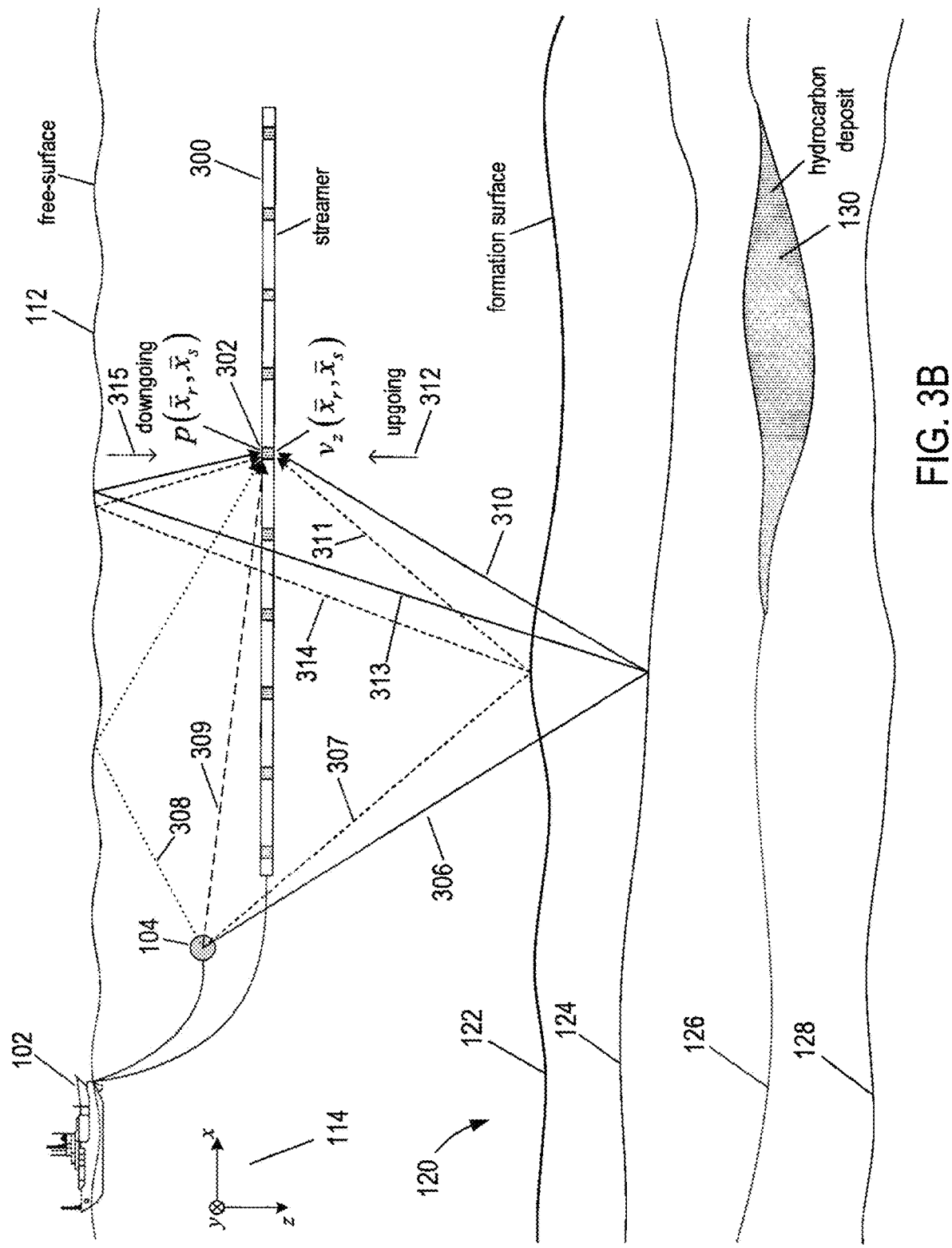
Figure 3C:
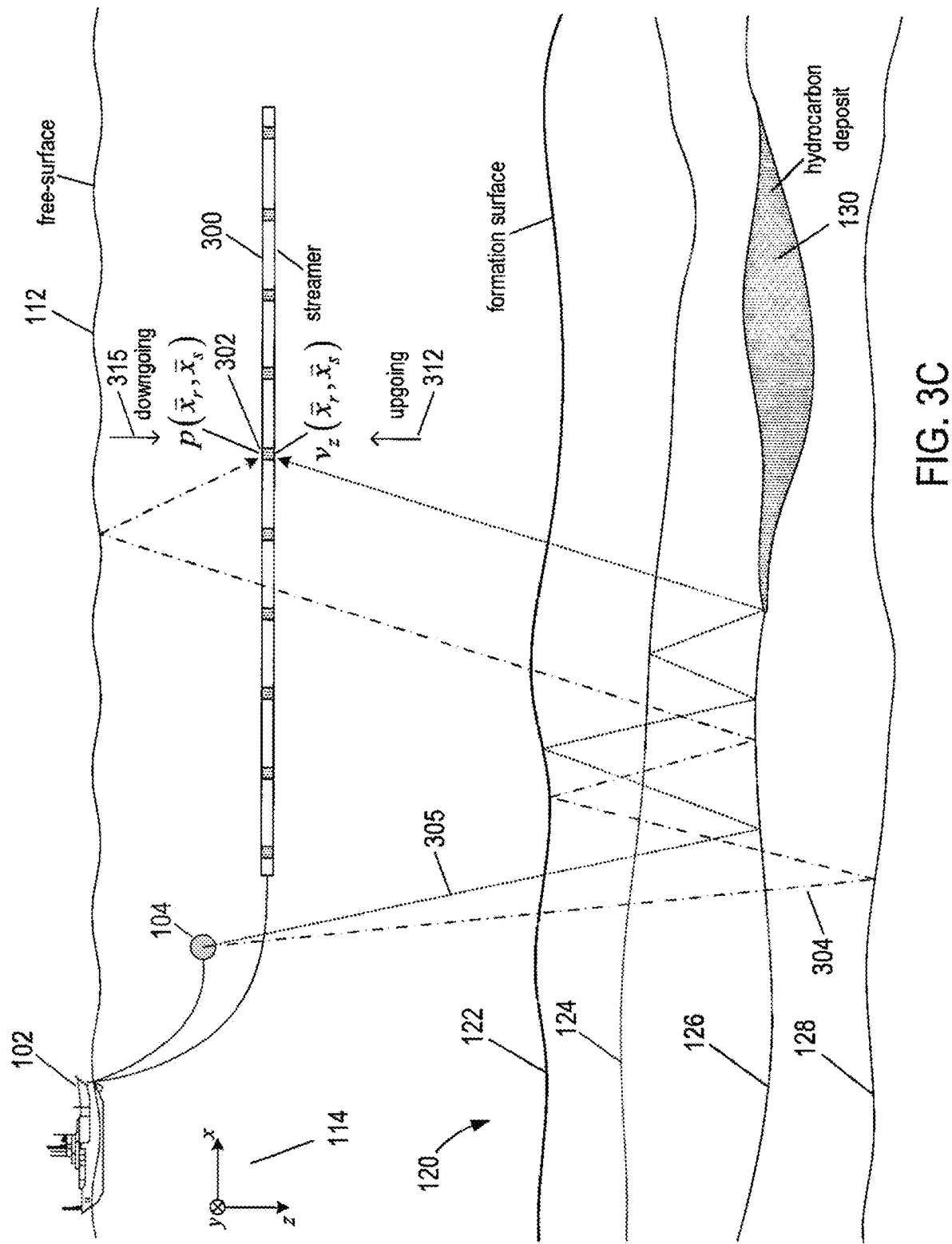

FIGS. 3A-3C show snapshots of different ray paths of acoustic energy that is emitted from the seismic source 104 and reverberates between the free surface 112 and the subterranean formation 120 before reaching the receiver 302. For the sake of simplicity, FIGS. 3A-3C illustrate only a few of many possible ray paths acoustic energy of an acoustic signal created by the seismic source 104 may travel before reaching the receiver 302. In FIG. 3A, directional arrows 304-309 represent ray paths of different portions of the source wavefield generated by the seismic source 104. For example, ray paths 304-307 represent portions of the source wavefield that penetrate to different interfaces of the subterranean formation 102, and ray path 308 represents a portion of the source wavefield that reaches the free surface 112. Ray path 309 represents the portion of the source wavefield that travels directly to the receiver 302. In FIG. 3B, ray path 308 is extended to present a downward reflection of the source wavefield from the free surface 112 (i.e., ghost source wavefield). Ray paths 310 and 311 represent reflections from the interface 124 and the formation surface 122 that travel directly to the receiver 302, which are called "upgoing primary reflections" or "primaries," as indicated by upgoing directional arrow 312. Ray paths 313 and 314 represent reflections from the interface 124 and the formation surface 122 followed by downward reflections from the free surface 112 before traveling directly to the receiver 302, which are called "downgoing reflections" as indicated by directional arrow 315. In FIG. 3C, ray paths 304 and 305 are extended to represent examples of multiple reflections between interfaces within the subterranean formation 120 and the free surface 112. Extended ray path 304 represents a downgoing free-surface multiple. Extended ray path 305 represents an upgoing multiple. In FIGS. 3B-3C, wavefields that are reflected downward from the free surface 112 before reaching the receivers, as represented by ray paths 313, 314, and 304, are examples of "downgoing wavefields" that may also be called "ghost wavefields" or "receiver ghosts." In FIGS. 3B-3C, wavefields that are reflected upward from the subterranean formation 120 before reaching the receivers, as represented by ray paths 310, 311, and 305, are examples of "upgoing wavefields." Seismic data may also record acoustic energy that propagated along interfaces as head waves (not shown) before being reflected upward to the surface 122. Seismic data may also record acoustic energy that propagated into layers with velocity gradients that increase with depth due to compression, creating diving waves (not shown) that are gradually turned upward to the surface 122.

Figure 3D:
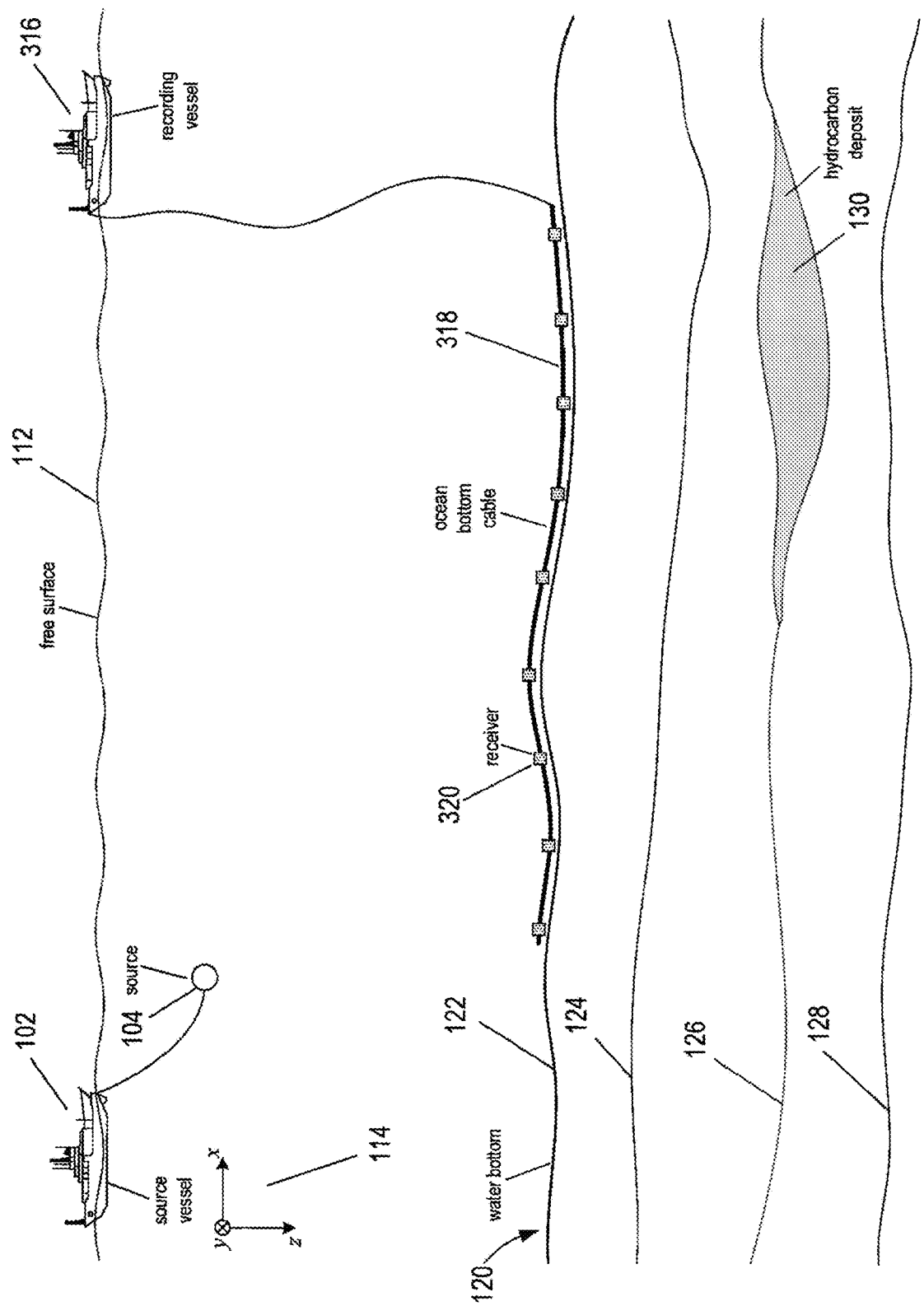
FIG. 3D shows a side-elevation view of an example ocean bottom cable-based seismic data acquisition system.

Subterranean formations may also be surveyed using ocean bottom seismic techniques. In one implementation, these techniques may be performed with ocean bottom cables ("OBCs") laid on or near the water bottom. FIG. 3D shows an example of a marine survey conducted with a source vessel 102 and a recording vessel 316 electronically connected to an OBC 318. In practice, the recording vessel 316 may be connected to any number of OBCs. The OBCs are similar to the towed streamer cables described above in that the OBCs include spaced-apart receivers, such as receiver 320, deployed approximately every 25 to 50 meters, but the OBCs are laid on or near the formation surface 120. As shown in the example of FIG. 3D, the source vessel 102 operates the source 104 as described above and the recording vessel 316 provides power, instrument command and control, and recordation of the seismic data produced by the receivers using recording equipment located on board the recording vessel 316.

In other implementations, ocean bottom nodes ("OBNs") may be deployed along the formation surface. Each node may have collocated pressure and/or particle motion sensors. The OBNs may be electronically connected to an anchored recording vessel that provides power, instrument command, and control of the pressure and/or vertical velocity wavefield sent to recording equipment located on board the vessel.

Land-Based Surveying

Figure 3E:
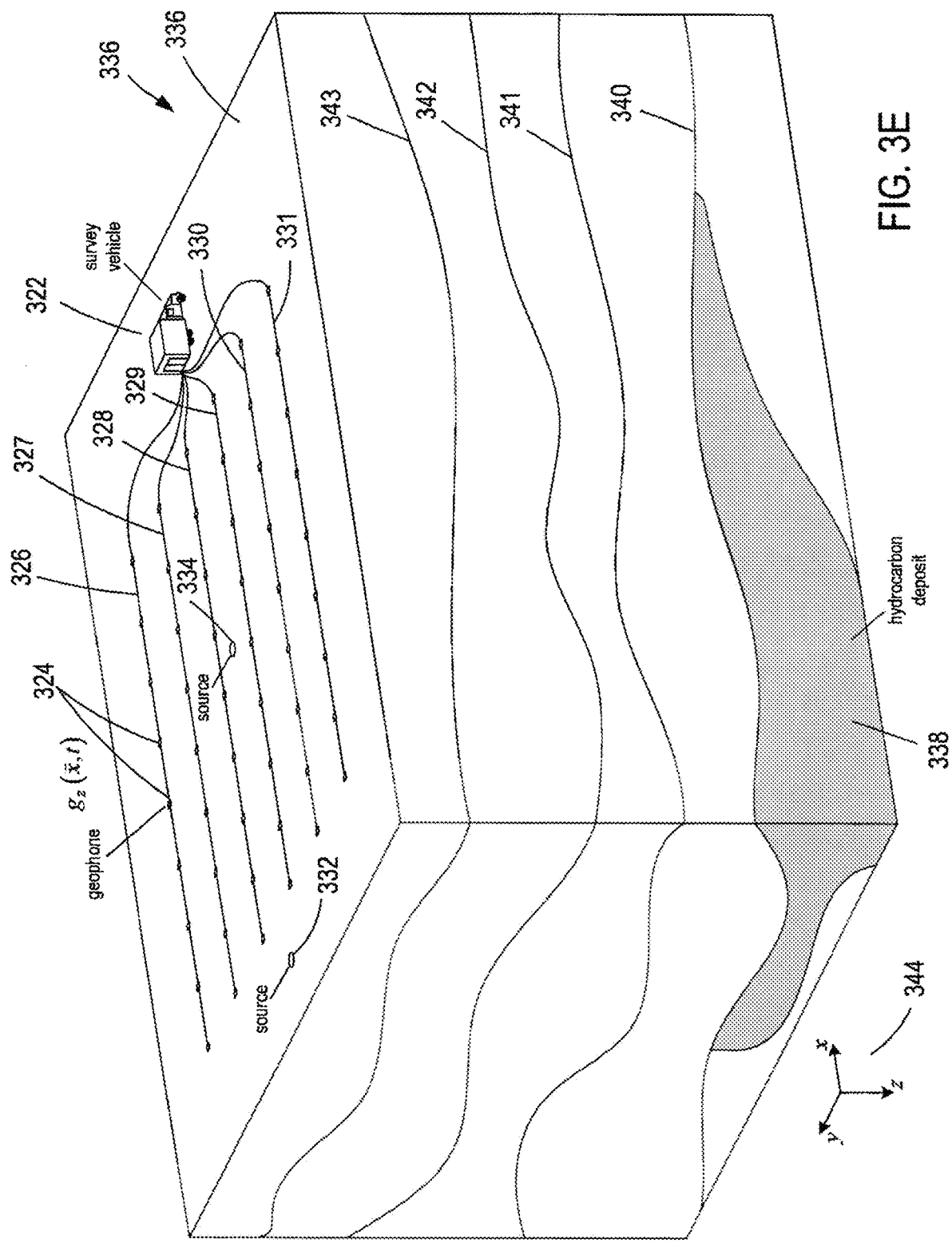
FIG. 3E shows an isometric view of an example land-based seismic data acquisition system.

For land surveys, particle motion sensors are typically deployed at fixed locations on the surface of a subterranean formation and one or more sources may be activated at different locations. FIG. 3E shows an isometric view of an example seismic data acquisition system comprising a survey vehicle 322, particle motion sensors, such as particle motion sensors 314, located along data transmission cables 326-331 that lead to the survey vehicle 322, and two sources 332 and 334. Block 336 represents a volume of a subterranean formation that includes a hydrocarbon deposit 338 located beneath layers of sediment and rock separated by interfaces 340-343. The locations of the sources 332 and 334 and particle motion sensors may be given with reference to a Cartesian coordinates system 344. Examples of sources 322 and 324 may include explosives located in boreholes, vibrators, or a weight that is slammed onto the formation surface by a thumper truck. The particle motion sensors 324 may be geophones placed at grid points on the subterranean formation surface 346 to detect particle motion in the z-direction denoted by $g_z(\vec{x}, t)$, sources 332 and 334 are activated to generate acoustic energy that travels down into the subterranean formation 336 to produce reflected acoustic wavefields that are detected by the particle motion sensors 324 as described above for marine surveys. The particle motion data may be stored at the receivers and/or sent along the data transmission cables to the survey vehicle 322, where the data may be stored electronically or magnetically on data-storage devices located in the survey vehicle 322.

Seismic Images and Velocity Models

Seismic imaging techniques, such as wave-equation migration methods and Kirchhoff migration, generate images of a subterranean formation by numerically solving an acoustic wave equation that characterizes the propagation of acoustic waves in the subterranean formation. Seismic imaging techniques depend on accurate velocity models that represent velocities of acoustic wave propagation in the different types of liquids, rocks, and sediments of the subterranean formation. In other words, the velocity model of a subterranean formation is used with seismic imaging techniques to accurately determine the depth of interfaces between layers and structures of different compositions. The resulting seismic images give visual cross-sectional representations of seismic sections of a subterranean formation and coordinate locations of reflections between layers and structures of different compositions and densities. The locations of reflections are displayed in an image of a seismic section of the subterranean formation. The image provides a visual representation of the complex geophysical structures within the subterranean formation.

A velocity model is a cross-sectional map, or image, of the seismic velocities associated with layers and structures of different materials of the subterranean formation. The seismic velocity associated with a material is the speed with which an acoustic wave propagates through the material. Different materials have a range of associated seismic velocities because seismic velocities generally increase with increasing depth due to increased pressure of the overburden. In addition to the velocity model being used to accurately determine the depths of the interfaces between layers and structures of a seismic image, the velocity model may also be used to aid geoscientists and geologists with distinguishing the composition of the various layers and structures in the seismic image. The following seismic velocity table lists seismic velocity ranges associated with different materials, rocks, and sediments:

| Seismic Velocity Table | |
|---|---|
| Material | Seismic velocity (km/s) |
| Water | 1.4-1.5 |
| Petroleum | 1.3-1.4 |
| Water-saturated sand | 1.5-2.0 |
| Tertiary sandstone | 2.0-2.5 |
| pennant sandstone | 4.0-4.5 |
| Cambrian quartzite (sandstone) | 5.5-6.0 |
| Cretaceous chalk (limestone) | 2.0-2.5 |
| Limestone | 3.0-4.0 |
| Carboniferous limestone | 5.0-5.5 |
| Salt | 4.5-5.0 |
| Granite | 5.5-6.0 |
| Gabbro | 6.5-7.0 |

(*Exploration Seismology* 2$^{nd}$ Ed., R. E. Sheriff and L. P. Geldart, Cambridge University Press, 1995.) Seismic velocities of a velocity model can be used to distinguish the layers in a seismic image from other layers in a seismic image, eliminate structures from consideration as containing a petroleum deposit while increasing the confidence that other structures in the image may contain petroleum deposits.

Geoscientists in the mining and the oil and gas industries carefully examine images of the geological structure of a subterranean formation and use velocity models of the subterranean formation to reveal the composition of the geological structures, and in particular, identify the structures that potentially contain mineral formations and oil and natural gas reservoirs. Without accurate seismic images and velocity models of subterranean formations, geoscientists would have to resort to randomly drilling test wells to find a mineral deposit or a reservoir of oil and natural gas, which is extremely expensive and time consuming.

Figure 4:
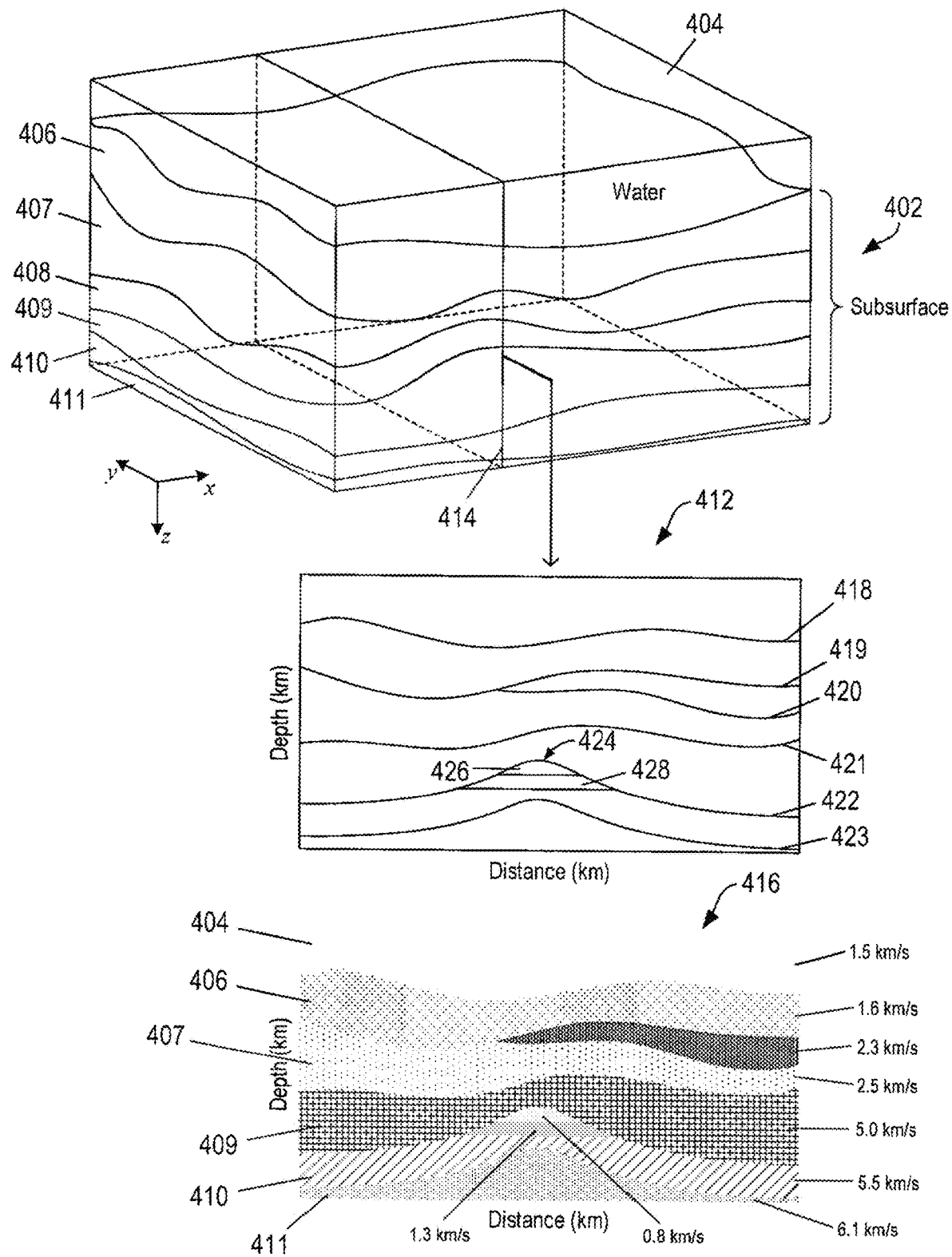
FIG. 4 shows an example volume of a subterranean formation located below a body of water and an associated seismic image and velocity model.

FIG. 4 shows an example volume of a subterranean formation 402 located below a body of water 404. In this example, the subterranean formation 402 comprises layers 406-411 of sediments and rocks of different compositions. FIG. 4 also shows an example seismic image 412 of a vertical plane cross-section 414 of the subterranean formation and an example velocity model 416 of the section 414 obtained from a hypothetical marine seismic survey the subterranean formation 402. The velocity model 416 is used to discuss the advantages of having an accurate velocity model in identifying the compositions of layers and structures of a subterranean formation. Curves 418-423 in image 412 represent interfaces between different types of rock and sediment that reveal the internal structure of the subterranean formation 402 in the vertical plane cross-section 414. Accurate placement of the interfaces 418-423 in the image 412 is determined by the accuracy of the velocity model 416. Image 412 alone does not necessarily reveal the composition of the layers and structures within image 412. For example, image 412 shows a cross-section of a dome-like structure 424 with layers 426 and 428. The image reveals the depth and location of the structure 424 within the subterranean formation 402. Natural gas and oil often accumulate at the top of such dome structures. As a result, a geoscientist or a geologist may view image 412 and speculate that the layers 426 and 428 may contain natural gas and oil. On the other hand, the layers 426 and 428 may correspond to materials that do not contain oil, such as salt or ground water. As a result, image 412 alone cannot be used to confirm with a high level of confidence that layers 426 and 428 contain natural gas and oil, respectively. The velocity model 416 can be used to aid geoscientists or geologists with eliminating certain materials and more confidently identify the compositions the various structures in image 412. In this example, differently shaded layers of the velocity model 416 correspond to seismic velocities of the layers in the image 412 can be used to identify the composition of the layers in image 412 with greater confidence. For example, the seismic velocity of the layer 404 is 1.5 km/s, which indicates the top layer of image 412 corresponds to the body of water 404. The seismic velocity of the layer 406 is 1.6 km/s, which indicates this layer below the body of water 404 is likely water-saturated sand. The seismic velocity of the layer 407 is 2.5 km/s, which indicates this layer is composed of tertiary sandstone or cretaceous chalk. The seismic velocities of 1.3 km/s and 0.8 km/s reveal that the corresponding layers 426 and 428 are more likely to be oil and natural than salt or water.

It should be noted that, in practice, seismic velocities of a velocity model may be more finely grained than the example velocity model 416 in FIG. 4. The velocity model 416 is provided as an example of how a velocity model can be used by geoscientists and geologists to aid with identifying the composition of various layers and structures within a subterranean formation. A petroleum exploration company relies on seismic images and corresponding velocity models to identify a potential petroleum deposit and estimate how large the petroleum deposit is. As a result, a petroleum exploration company has greater confidence in deciding whether to undertake the expensive process of drilling a test well to confirm that a petroleum deposit is present.

Full-waveform inversion ("FWI") is a computer-implemented technique for obtaining accurate high-resolution, high-fidelity velocity models of subterranean formations from the low frequency portion of recorded seismic data, such a seismic data with frequencies less than about 20 to 30 Hz. FWI iteratively refines a velocity model that minimizes a residual difference between modeled seismic data and the recorded seismic data.

Figure 5:
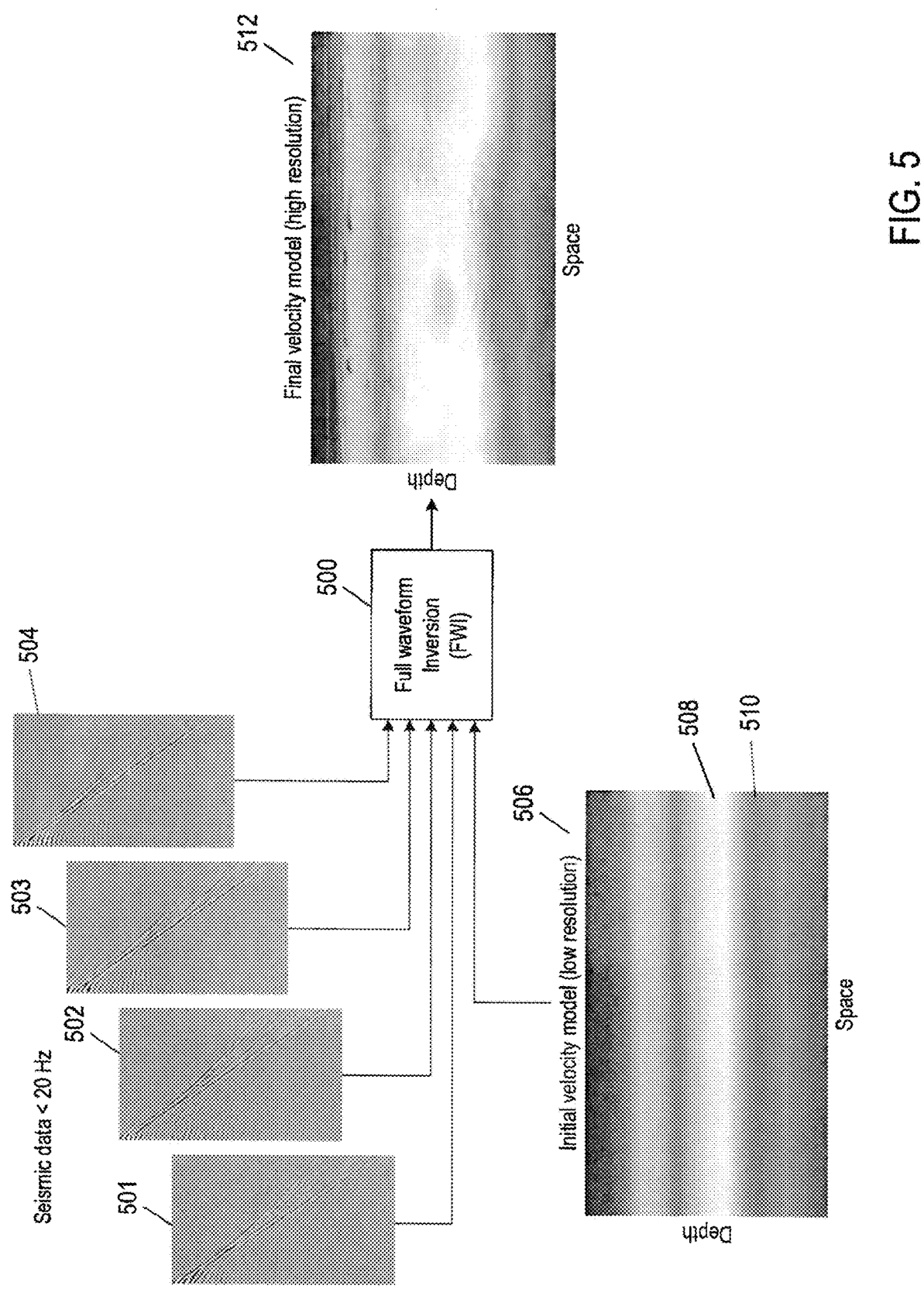
FIG. 5 shows an example of full-waveform inversion ("FWI") used to generate a high-resolution velocity model from shot gathers of seismic data and an initial low-resolution velocity model.

FIG. 5 shows an example of FWI used to generate a high-resolution velocity model from shot gathers of seismic data and an initial low-resolution velocity model. Block 500 represents the iterative process of FWI. Four consecutive shot gathers 501-504 obtained from a seismic survey of a subterranean formation have been frequency filtered to contain seismic data with frequencies less than 20 Hz. The shot gathers 501-504 are input to the FWI 500. An initial low resolution velocity model 506 of the synthetic subterranean formation is also input to the FWI 500. Horizontal light and dark bands represent different seismic velocities. For example, light shaded band 508 represents a band of seismic velocities, and darker shaded band 510 represents a different band of seismic velocities. The iterative process of FWI 500 outputs a final higher resolution velocity model 512 of the subterranean formation. Note that FWI has adjusted the bands of seismic velocities to ideally conform to the true seismic velocities of the materials comprising the geological layers and structures of the subterranean formation.

In the Example of FIG. 5, the shot gathers 501-504 are not contaminated with low frequency noise. As a result, the final velocity model 512 closely matches the seismic velocities of the synthetic subterranean formation. However, in practice, raw seismic data obtained in an actual seismic survey is typically contaminated with noise—particularly low frequency noise that is challenging to separate from the signal component of the seismic data. The signal component is used to construct the velocity model and compute an image of the subterranean formation. The presence of noise or residual noise in the data reduces seismic image resolution and delineation of subsurface layers and reservoir boundaries. Examples of different types of low frequency noise in marine surveys include hydrostatic pressure variation noise that ranges from about 0-2 Hz, streamer vibration noise ranges from about 0-20 Hz, swell noise that ranges from about 1-15 Hz, and tugging/strumming noise from the survey vessel that ranges from about 3-10 Hz.

Figure 6:
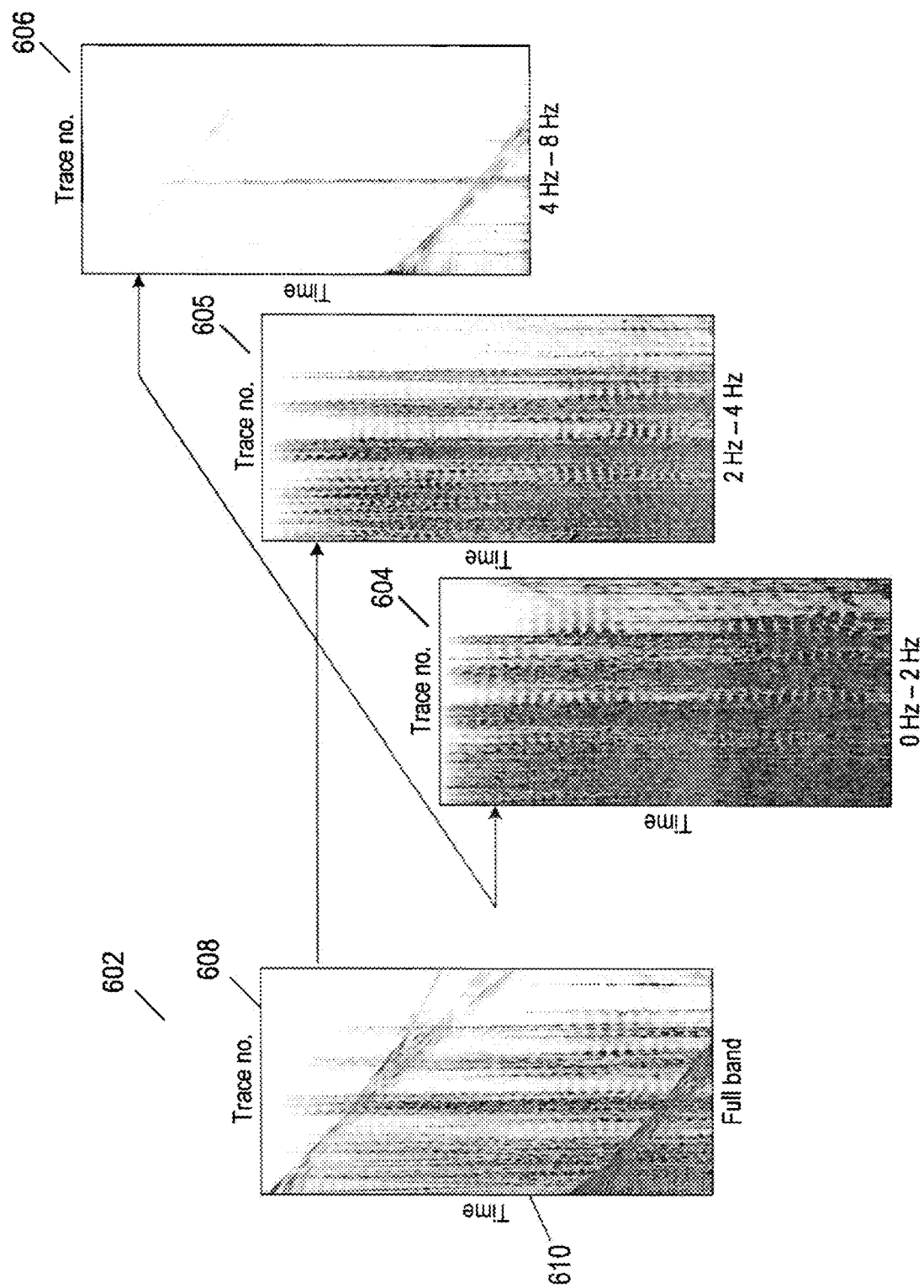
FIG. 6 shows an example of a shot gather contaminated with low frequency noise.

FIG. 6 shows an example of a shot gather 602 contaminated with low frequency noise. The shot gather 602 is contaminated with low frequency noise represented by dark vertical striations or streaks. FIG. 6 also shows the shot gather 602 separated into three shot gathers 604-606 that correspond to different low frequency bands. Each gather includes a trace number axis, such as trace number axis 608, that corresponds to increasing distance with increasing shot number and includes a time axis, such as time axis 610. Shorter times correspond to shallow reflections from within the subterranean formation and longer times correspond to deeper reflections from within the subterranean formation. Shot gather 604 contains the seismic data of the shot gather 602 with corresponding frequencies between 0 and 2 Hz. Shot gather 605 contains the seismic data of the shot gather 602 with corresponding frequencies between 2 and 4 Hz. Shot gather 606 contains the seismic data of the shot gather 602 with corresponding frequencies between 4 and 8 Hz. Comparison of the shot gathers 604-606 reveals that most of the low frequency noise contamination in the shot gather 602 is between 0-4 Hz.

Figure 7:
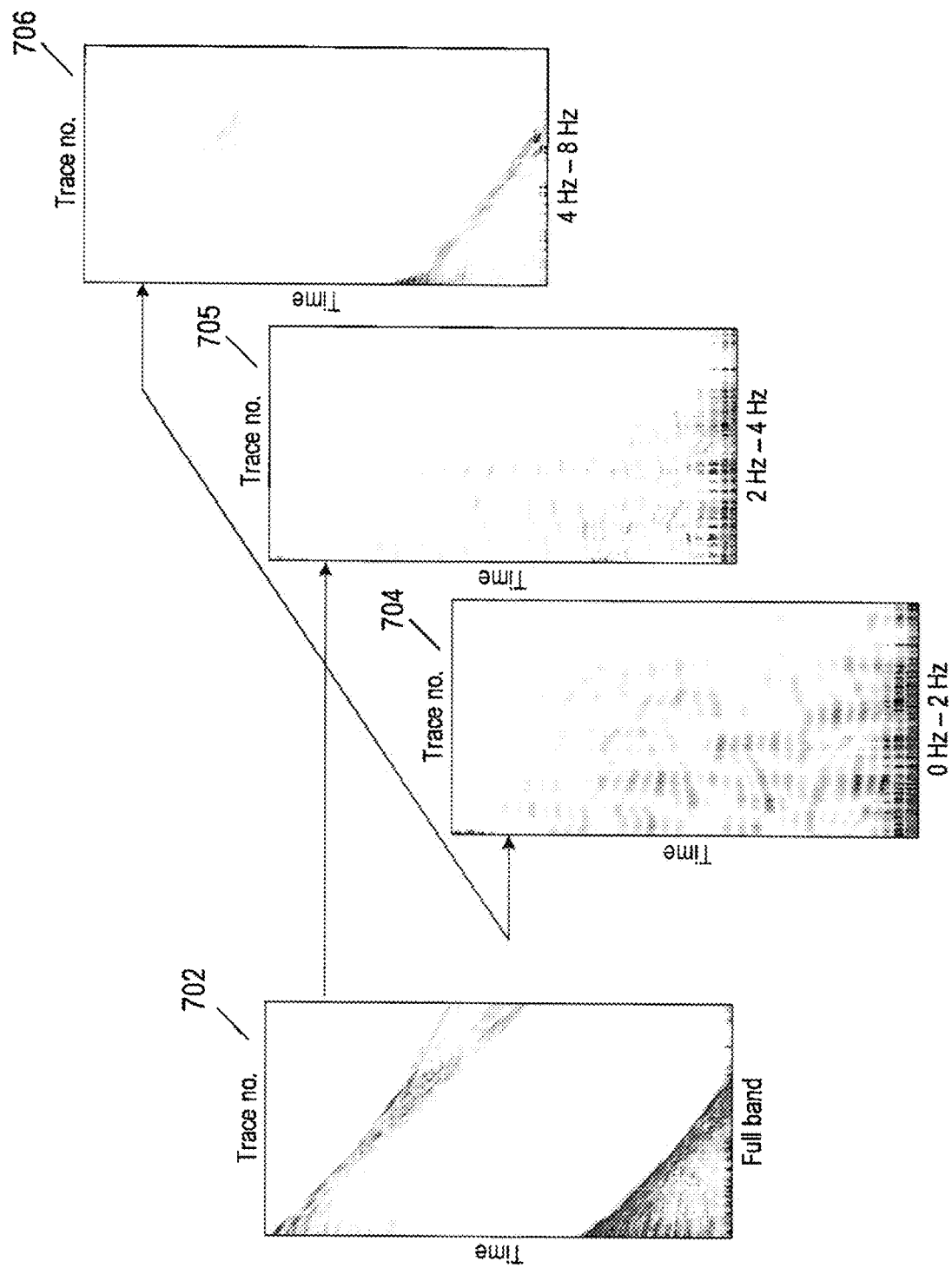
FIG. 7 shows the low frequency noise contaminated shot gather in FIG. 6 after performing a conventional denoising technique.

FIG. 7 shows a shot gather 702 obtained after a conventional denoising technique has been applied to the low frequency noise contaminated shot gather 602 in FIG. 6. FIG. 7 also shows the shot gather 702 separated into three shot gathers 704-706 that correspond to the low frequency bands of the shot gathers 604-606. Note that conventional denoising has removed much of the low frequency noise from shortest time ranges of the shot gathers, which correspond to shallow regions of the subterranean formation. Conventional denoising techniques also have the disadvantage of reducing, and in some cases removing, the desired signal from the seismic data. Shot gathers 704 and 705 reveal that conventional denoising has removed the desired signal in the frequency bands of 0-2 Hz and 2-4 Hz, respectively. As a result, a velocity model obtained from the shot gather 702 after conventional denoising does not accurately represent the signal in the low frequency band of 0-4 Hz. A seismic image obtained with the velocity model does not accurately represent the features within the subterranean formation.

Processes and Systems for Reconstructing Low Frequency Signal in Seismic Data Processes and systems for reconstructing the low frequency signal of low frequency contaminated seismic data from higher frequency signal of the seismic data where the signal-to-noise ratio is much higher are described below. The low frequency contaminated seismic data can be raw seismic data obtained from a seismic survey or seismic data that has been pre-processed to remove noise with noise attenuation solutions such as FXDECON (See e.g., L. Canales, *Random noise reduction*, "54th Annual international meeting. SEG expanded abstract", pp. 525-527 (1984)). The resulting seismic data is called "low frequency reconstructed seismic data." which contains the original seismic data associated with the high frequency signal and reconstructed seismic data over the low frequencies. The reconstructed seismic data has higher signal-to-noise content at low frequencies than processing the seismic data using conventional low frequency noise attenuation techniques.

The seismic data is transformed to one of the frequency-slowness domain, the frequency-velocity domain, or the frequency-wavenumber domain. Reconstruction of the low frequency signal of the seismic data is performed on complex samples (i.e., jointly on the real and imaginary parts of the seismic data) of traces over frequencies in the frequency domain. When the transformation is to the frequency-slowness domain, then the reconstruction is performed independently on traces over frequencies for each slowness value. When the transformation is to the frequency-velocity domain, then the reconstruction is performed independently on traces over frequencies for each velocity value. When the transformation is to the frequency-wavenumber domain, then the reconstruction is performed independently on traces over frequencies for each wavenumber value. The low frequency reconstructed seismic data is transformed back to the space-time domain. In the following discussion, the frequency-slowness domain, frequency-velocity domain, and the frequency-wavenumber domain are referred to as intermediate domains in which reconstruction of the low frequency signal of the seismic data is performed. Examples of reconstructing low frequency signal is performed in the frequency-slowness domain. The same operations are performed for traces of frequencies in the frequency-velocity and frequency-wavenumber domains.

Figure 8:
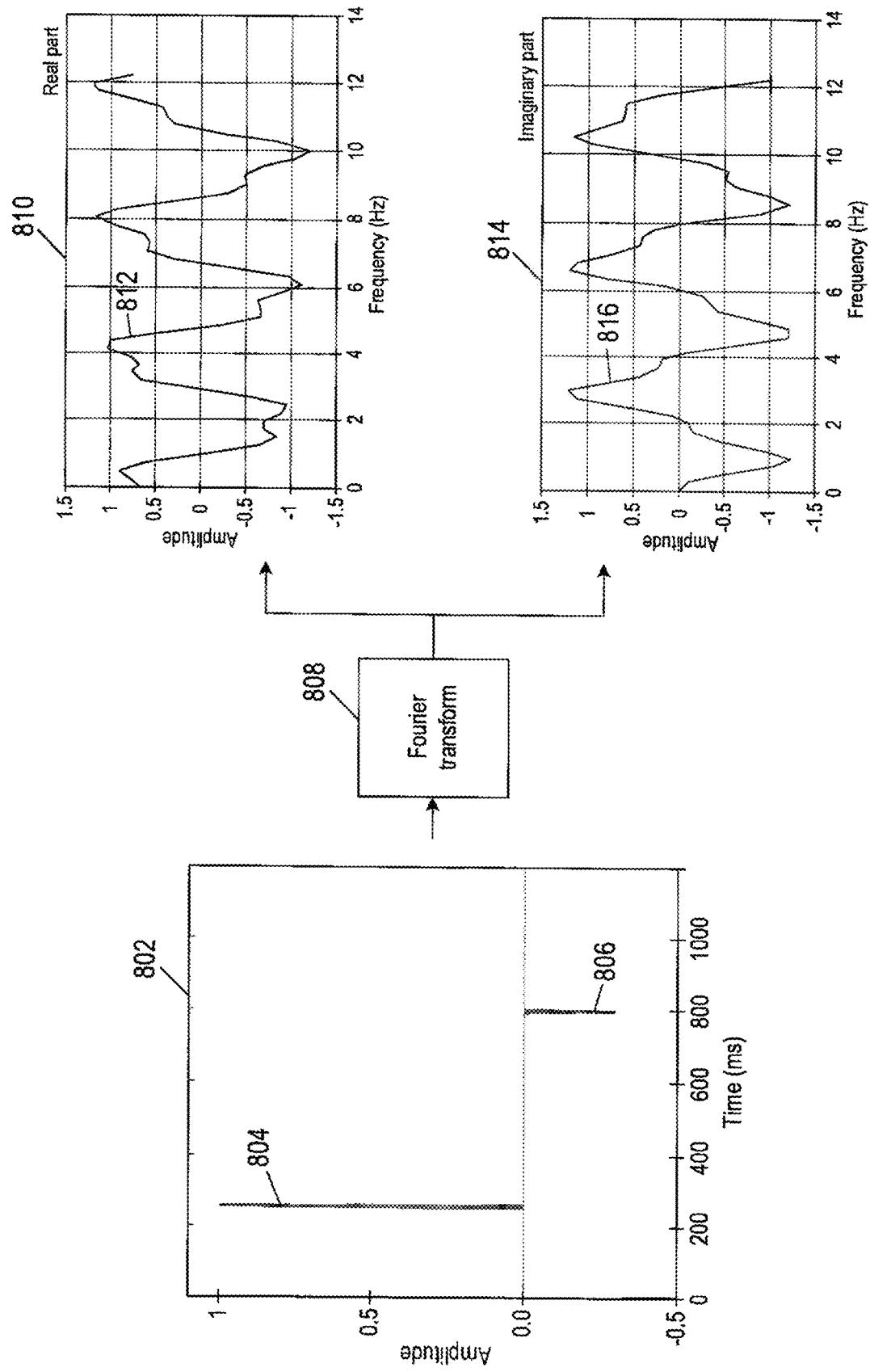
FIG. 8 shows a plot of an example trace of seismic data generated by a receiver.

FIG. 8 shows a plot 802 of an example ideal synthetic trace of seismic data measured by a receiver which can be either a hydrophone (i.e., pressure sensor) or a geophone (i.e., velocity or acceleration sensor). The data consists of isolated spikes that corresponds to reflections from two subsurface geological interfaces. For example, spike 804 represents a reflection from a shallow interface within a subterranean formation. Spike 806 represents a reflection from a deeper interface within the subterranean formation. Note that this seismic data does not contain noise or background reflections. Block 808 represents transforming the seismic data from the time domain to the frequency domain. Plot 810 contains the real part of the seismic data represented by curve 812 in the frequency domain. Plot 814 contains the imaginary part of the seismic data represented by curve 816 in the frequency domain. Curve 812 is a combination of two linear harmonics associated with the spikes 804 and 806. This association stems from the time-frequency duality, which states that a spike in the time domain maps to a linear harmonic in the frequency domain and a linear harmonic in the time domain maps to a spike in the frequency domain. A linear harmonic can be represented by a function $f(x)=ae^{j\omega x}$, where x is a variable, and a and $\omega$ are parameters that are independent of the value of x. The principle of linearity and superposition applies to this duality, which means that a superposition of spikes in the time domain maps into a superposition of harmonics in the frequency domain. Curve 816 is a combination of two linear harmonic oscillations associated with the spikes 804 and 806.

Figure 9:
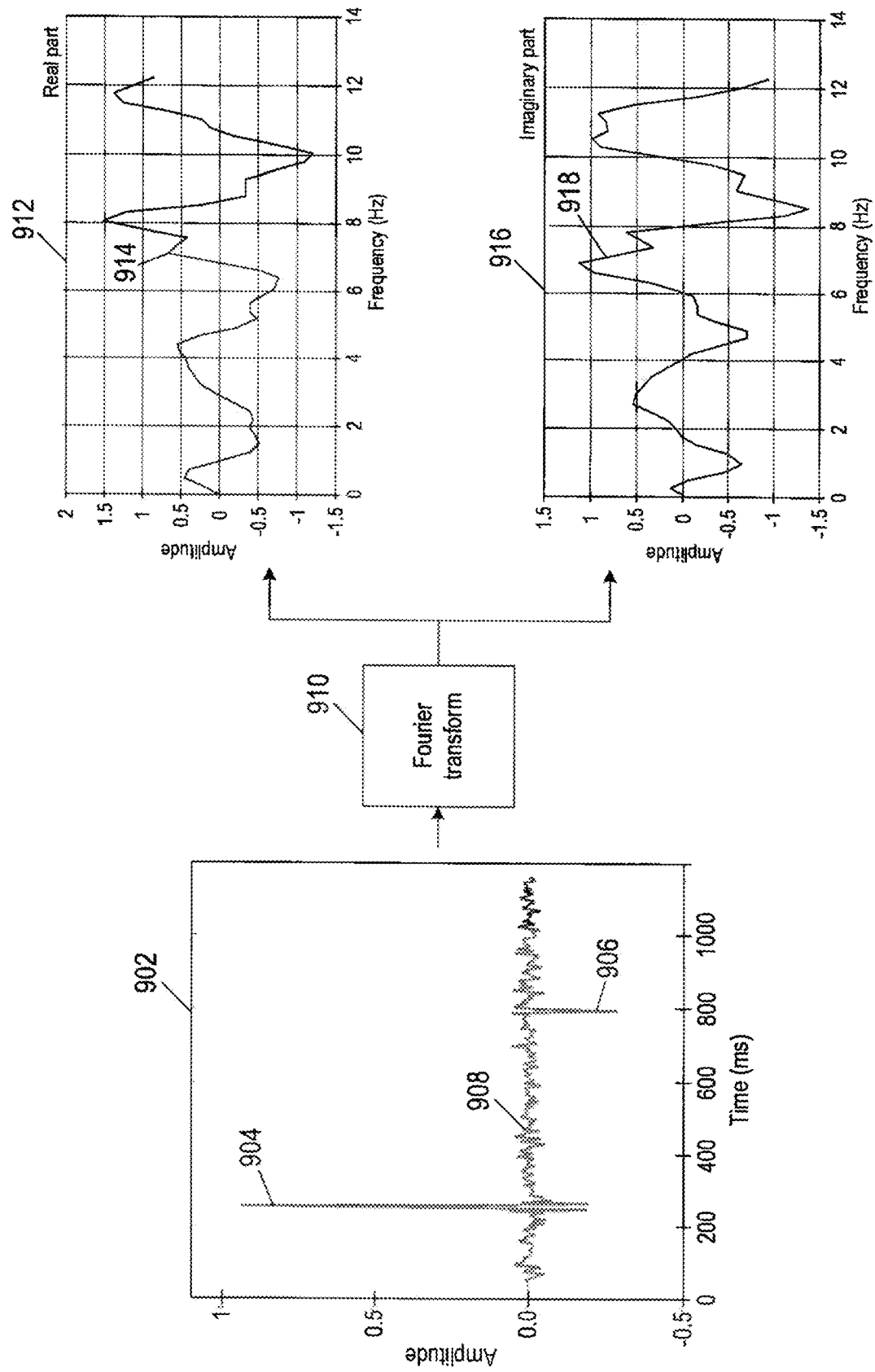
FIG. 9 shows a plot of the example trace of seismic data in FIG. 8 contaminated with low frequency noise.

FIG. 9 shows a plot 902 of a more "realistic" example synthetic trace of seismic data with noise and background weak reflections. For example, spike 904 represents a reflection from a shallow interface within a subterranean formation. Spike 906 represents a reflection from a deeper interface within the subterranean formation. Small amplitude random fluctuations 908 are related to the background reflections and noise. Block 910 represents transforming the seismic data from the time domain to the frequency domain. Plot 912 contains the real part of the seismic data represented by curve 914 in the frequency domain. Plot 916 contains the imaginary part of the seismic data represented by curve 918 in the frequency domain. Comparison of the real and imaginary parts of the "realistic" synthetic seismic data in FIG. 9 with the real and imaginary parts of the ideal synthetic seismic data in FIG. 8 reveals that the noise and background reflections disrupt the linear harmonic structure of the real and imaginary parts of the ideal synthetic seismic data in FIG. 9. Curve 914 is a combination of two linear harmonic sinusoidal oscillations associated with the spikes 904 and 906. However, comparison of the curve 914 with the corresponding curve 812 in FIG. 8 reveals that the harmonics are no longer linear but rather non-linear with both amplitude and/or harmonic beat values that drift with frequency. Likewise, comparison of the curve 918 with the corresponding curve 816 in FIG. 8 reveals that the harmonics are no longer linear but rather non-linear with both amplitude and/or harmonic beat value that drifts with frequency.

Process and systems reconstruct the low frequency signal of seismic data from the higher frequency signal of the same seismic data by replacing low frequency portions of the seismic data with reconstructed values obtained from the seismic data over higher frequencies. In one implementation, a linear autoregressive model is used to backward extrapolate the low frequency samples from the high frequency samples. The linear autoregressive model is given by:

$$y(n) = \sum_{k=1}^{K} a_k^{(n)} y(n+k) + \varepsilon(n) \qquad (2)$$

where
- n is a frequency index that represents a frequency $f_n$ in Hz;
- y(n) is the complex Fourier sample at the frequency $f_n$;
- K is the number of terms;
- $\alpha_1^{(n)}, \alpha_2^{(n)}, \ldots, \alpha_K^{(n)}$ are the parameters of the autoregressive model, known also as the linear prediction coefficients ("LPCs"); and
- ε(n) is random noise.

The number of terms K in Equation (2) is selected by a user. For example, a user may select a value of K greater than or equal to 7. The LPC parameters in Equation (2) are estimated by solving a least squares minimization of the total error given by $$\left(\hat{\alpha}_1^{(n)}, \hat{\alpha}_2^{(n)}, \ldots, \hat{\alpha}_K^{(n)}\right) = \underset{\hat{\alpha}_1^{(n)}, \hat{\alpha}_2^{(n)}, \ldots, \hat{\alpha}_K^{(n)}}{\operatorname{argmin}} \sum_{m=n+1}^{n+L} \left| y(m) - \sum_{k=1}^{K} \alpha_k^{(n)} y(m+k) \right|^2 \quad (3)$$

where L is the number of complex Fourier samples used in the estimation of the LPCs. The estimation of LPCs uses the frequency band $[f_{n+1}, f_{n+L}]$ of the seismic data which is assumed to have good signal-to-noise ratio. This number is set such that L>K. Minimizing the cost function in Equation (3) leads to solving for estimated LPCs as a linear system of equations, known as the Yule-Walker set of equations given by $$P^{(n)} \vec{\hat{\alpha}}^{(n)} = \vec{\rho}^{(n)} \quad (4a)$$

where $$\vec{\hat{\alpha}}^{(n)} = \begin{bmatrix} \hat{\alpha}_1^{(n)} \\ \vdots \\ \hat{\alpha}_K^{(n)} \end{bmatrix} \quad (4b)$$

$$P^{(n)} = \begin{bmatrix} R(0) & R(1) & \cdots & R(K-1) \\ R(-1) & R(0) & \cdots & R(K-2) \\ \vdots & & \ddots & \vdots \\ R(1-K) & R(2-K) & \cdots & R(0) \end{bmatrix} \quad (4c)$$

and $$\vec{\rho}^{(n)} = \begin{bmatrix} R(-1) \\ R(-2) \\ \vdots \\ R(-K) \end{bmatrix} \quad (4d)$$

with matrix elements given by $$R(i) = \sum_{m=n+1}^{n+L} y(m+i) y^*(m) \quad (4e)$$

and "*" denotes the complex conjugate. Once the LPCs are estimated using Equation (4a)-(4e) the following linear autoregressive model is used to backward extrapolate low frequency complex samples of the seismic data from higher frequency complex samples of the seismic data:

$$y(n) = \sum_{k=1}^{K} \hat{\alpha}_k^{(n)} y(n+k) \quad (5)$$

Figure 10:
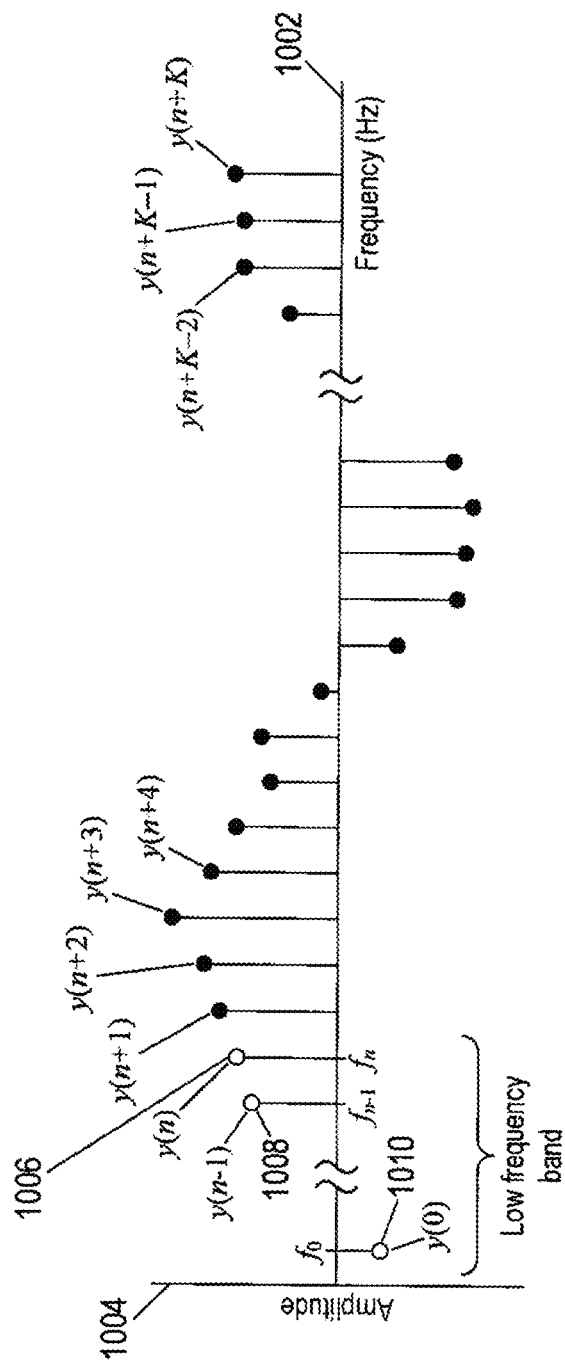
FIG. 10 shows an example of an extrapolated sequence of amplitudes in a low frequency band of a frequency domain.

FIG. 10 shows an example of backward extrapolation of a sequence of amplitudes to obtain extrapolated amplitudes in a low frequency band using the linear autoregressive model of Equation (5). Horizontal axis 1002 represents a range of frequencies. Vertical axis 1004 represents a range of amplitudes. The low frequency band contains discrete frequencies $f_0, \ldots, f_n$ that are reconstructed because of low frequency noise or simply weak amplitudes that were not recorded in a seismic survey. Amplitudes at frequencies in the low frequency band are replaced with extrapolated amplitudes using the linear autoregressive model of Equation (5). Solid dots represent a sequence of K original amplitudes of the complex sample in the frequency domain. For example, certain solid dots are labeled with corresponding amplitudes y(n+1), y(n+2), ..., y(n+K). The parameter weights $\vec{\alpha}^{(n)}$ of Equation (5) are computed according to the matrix calculation in Equations (4a)-(4e) for each extrapolated amplitude in the low frequency band. Open dot 1006 represents the backward extrapolated amplitude y(n) at frequency $f_n$ calculated for a first set of parameter weights $\vec{\alpha}^{(n)}$ according to Equation (5) from the K forward amplitudes represented by solid dots. Open dot 1008 represents a next extrapolated amplitude y(n−1) at a frequency $f_{n-1}$ in the low frequency band. The extrapolated amplitude y(n−1) 1008 is obtained by calculating a new set of parameter weights $\vec{\alpha}^{(n-1)}$ of Equation (5) from the set of amplitudes represented by open dot 1006 and the amplitudes y(n), y(n+1) ..., y(n+K−1) according to the matrix calculation in Equation (5). The process is repeated until an extrapolated amplitude y(0) 1010 is calculated at the smallest discrete frequency $f_0$ in the low frequency band. Backward extrapolation of the amplitudes in the low frequency band gives low frequency reconstructed amplitudes y(0), ..., y(n) that are free of the low frequency noise contamination the low frequency band. The sequence of amplitudes y(0), ..., y(n), y(n+1) ..., y(n+K) is the low frequency reconstructed seismic data in the frequency domain. An inverse Fourier transform is used to inverse transform the low frequency reconstructed seismic data from the frequency domain to the space-time domain to obtain low frequency reconstructed seismic data in the space-time domain.

Figure 11A:
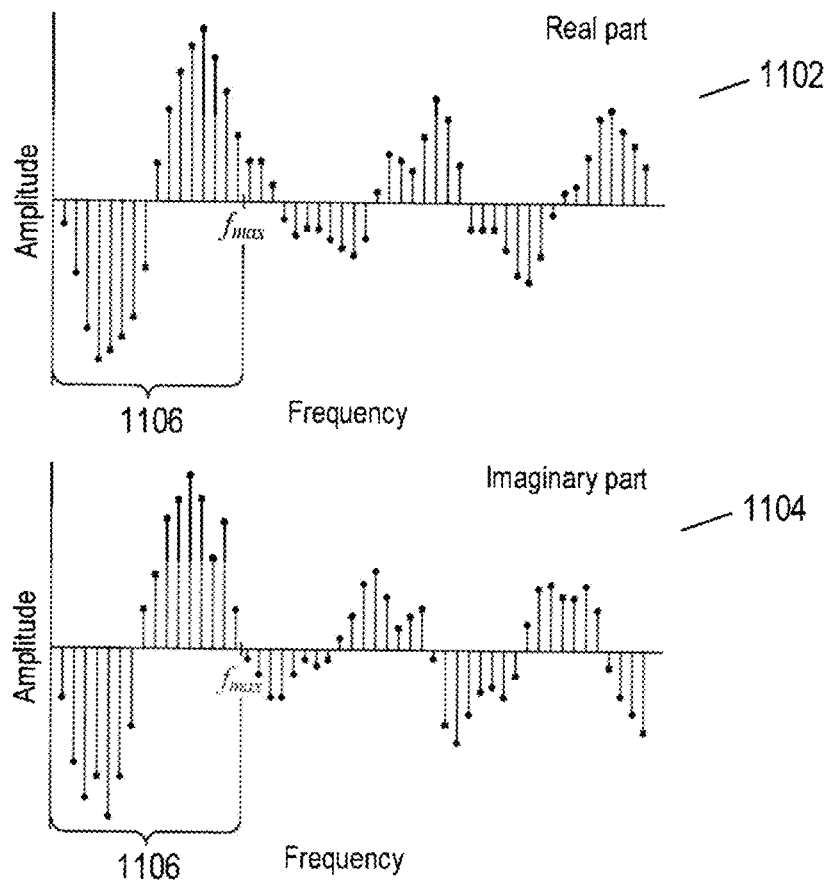
FIGS. 11A-11F show an example of using extrapolation to replace low frequency signal in real and imaginary parts of seismic data in the frequency domain.
Figure 11B:
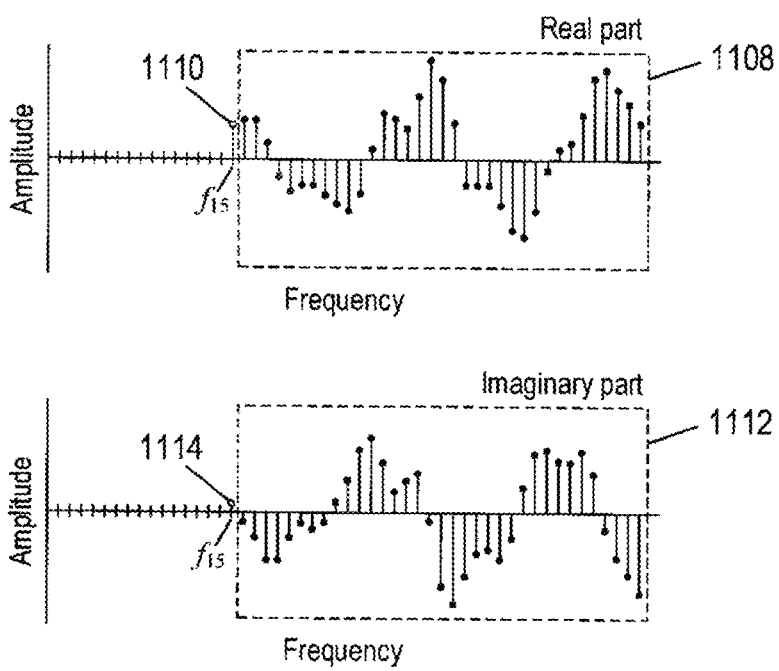
Figure 11C:
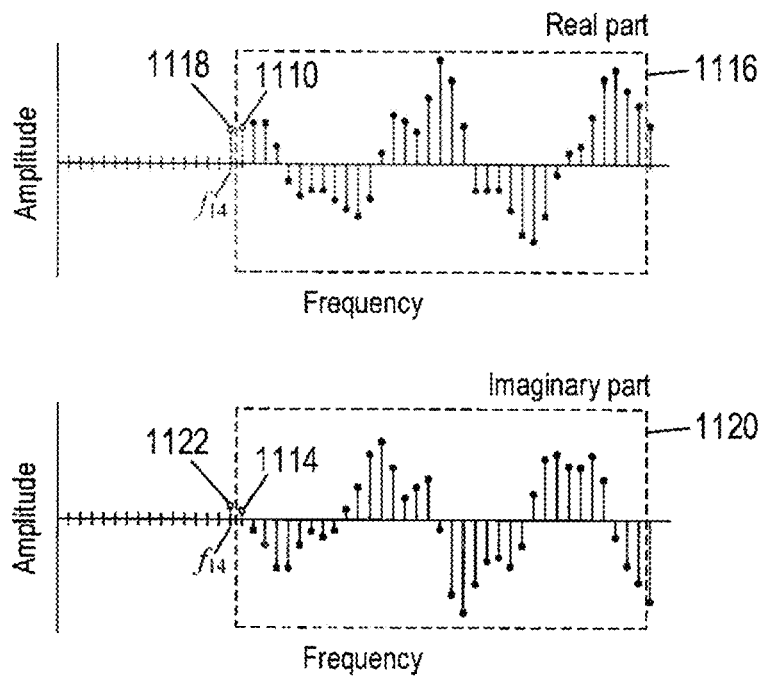
Figure 11D:
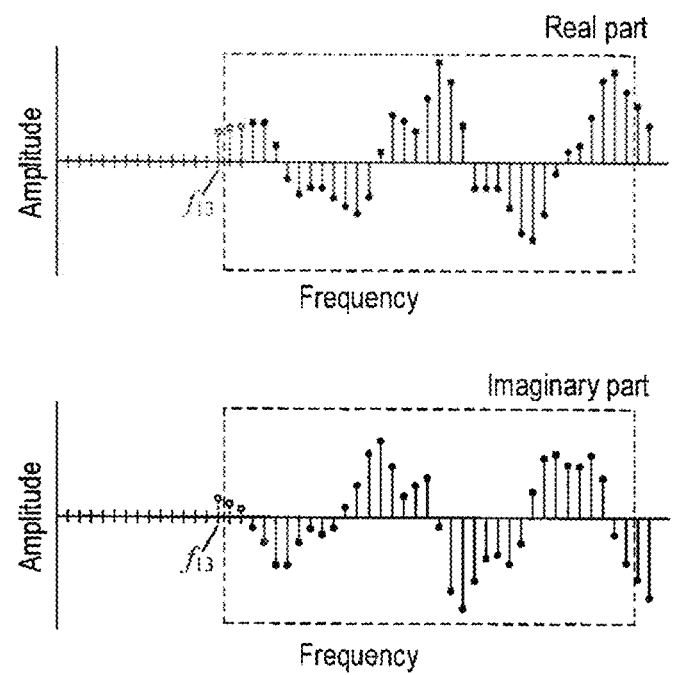
Figure 11E:
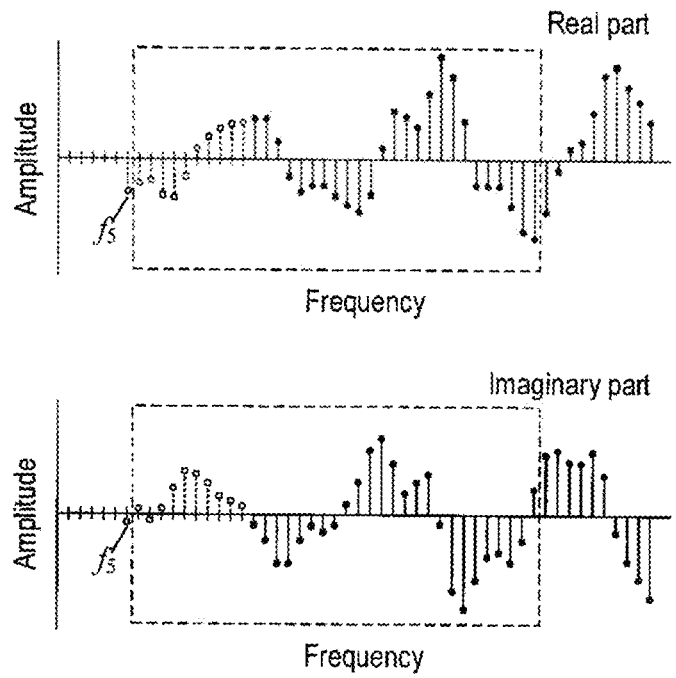
Figure 11F:
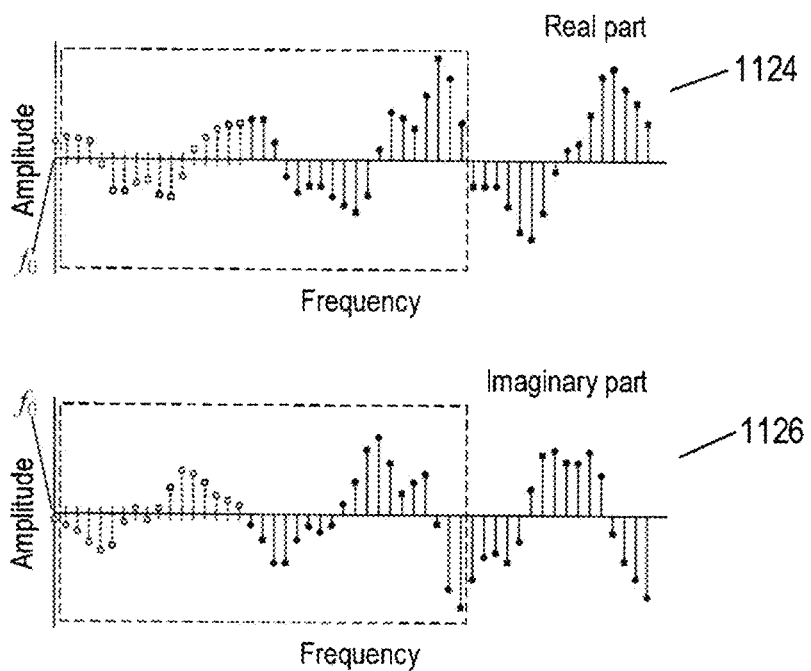

FIGS. 11A-11F show an example of using extrapolation to replace low frequency signal of seismic data in the frequency domain. In FIGS. 11A-11F, horizontal axes represent a range of frequencies, vertical axes represent a range of amplitudes, solid dots represent amplitudes of the real and imaginary parts of the complex samples in the frequency domain, and open dots represent extrapolated amplitudes of the real and imaginary parts in the frequency domain. FIG. 11A shows plots 1102 and 1104 of corresponding real and imaginary parts of a seismic data in the frequency domain. In this example, the original seismic data is contaminated with low frequency noise that exaggerates the amplitudes at frequencies in a low frequency band 1106 by comparison to the amplitudes at higher frequencies. The frequency $f_{max}$ denotes the maximum frequency of the low frequency band 1106. Frequencies below the frequency $f_{max}$ are reconstructed using backward extrapolation described above with reference to FIG. 10 because of low frequency noise or weak amplitudes that were not recorded in a seismic survey. The original seismic data in the low frequency band 1106 has a lower signal-to-noise ratio than seismic data with frequencies greater than the low frequency band. In this example, the low frequency band encompasses 16 frequencies denoted by $f_0, f_1, \ldots, f_{15}$, where amplitudes are extrapolated for frequencies that satisfy the condition $f_j < f_{max}$ for j=0, ..., 15. FIGS. 11B-11F show the real and imaginary parts of the extrapolated amplitudes at the discrete frequencies in the low frequency band 1106. In FIGS. 11B-11F, dashed rectangles are used to identify 35 (i.e., K=35) amplitudes of the real and imaginary parts of the complex samples that are used to build the linear autoregressive model of Equation (5), which is used to backward extrapolate amplitudes at discrete frequencies in the low frequency band 1106. For example, in FIG. 11B, a dashed rectangle 1108 encompasses 35 amplitudes of the real part that are closest to the frequency $f_{15}$ and a dashed rectangle 1112 encompasses 35 amplitudes of the imaginary part. These 35 real and imaginary amplitudes are used to generate extrapolated amplitudes 1110 and 1114 at frequency $f_{15}$ according to Equations (4a)-(5) as described above with reference to FIG. 10. Subsequent extrapolated complex samples are computed based on the closest set of 35 amplitudes, including previously extrapolated amplitudes at higher frequencies of the low-frequency band. For example, in FIG. 11C, the real and imaginary parts of the extrapolated complex samples are computed at frequency $f_{14}$. A dashed rectangle 1116 encompasses 35 amplitudes of the real amplitudes that are closest to the frequency $f_{14}$, including the extrapolated amplitude 1110, and a dashed rectangle 1120 encompasses 35 imaginary amplitudes that are closest to the frequency $f_{14}$, including the extrapolated amplitude 1114. These 35 amplitudes are used to compute extrapolated amplitudes 1118 and 1122 at frequency $f_{14}$ according to Equations (4a)-(5) as described above with reference to FIG. 10. FIGS. 11D-11F show the extrapolated real and imaginary amplitudes of extrapolated complex samples computed at the frequencies $f_{13}$, $f_5$, and $f_0$. The low frequency noise contaminated amplitudes in the low frequency band of FIG. 11A have been replaced by extrapolated real and imaginary amplitudes shown in FIG. 11F to obtain low frequency reconstructed seismic data with real and imaginary parts displayed in plots 1124 and 1126. The low frequency reconstructed seismic data are inverse transformed using an inverse Fourier transform.

Figures 12A, 12B:
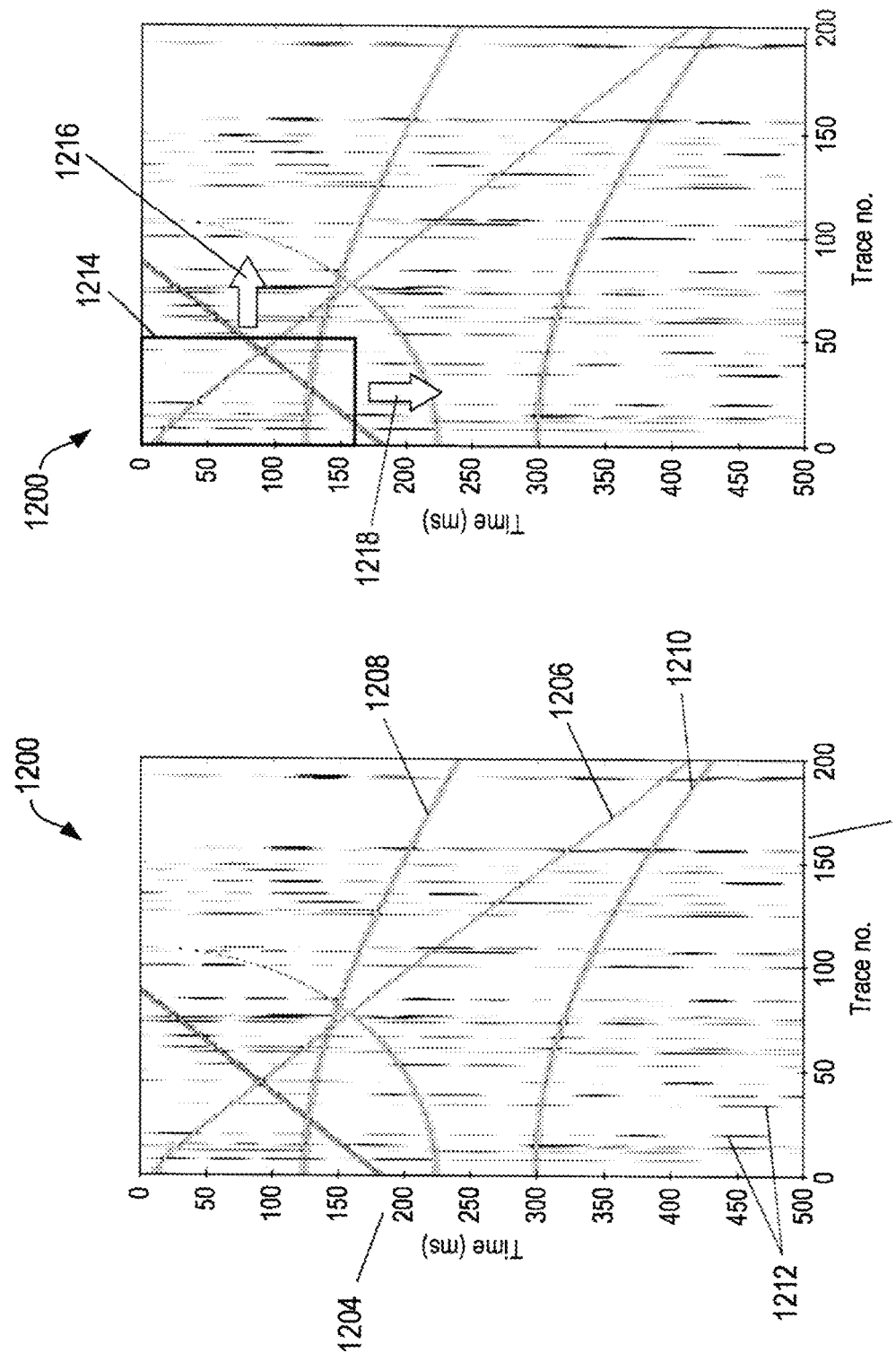
FIGS. 12A-12C show an example of space-time windows used to extract seismic data from an example shot gather contaminated with low frequency noise.
Figure 12C:
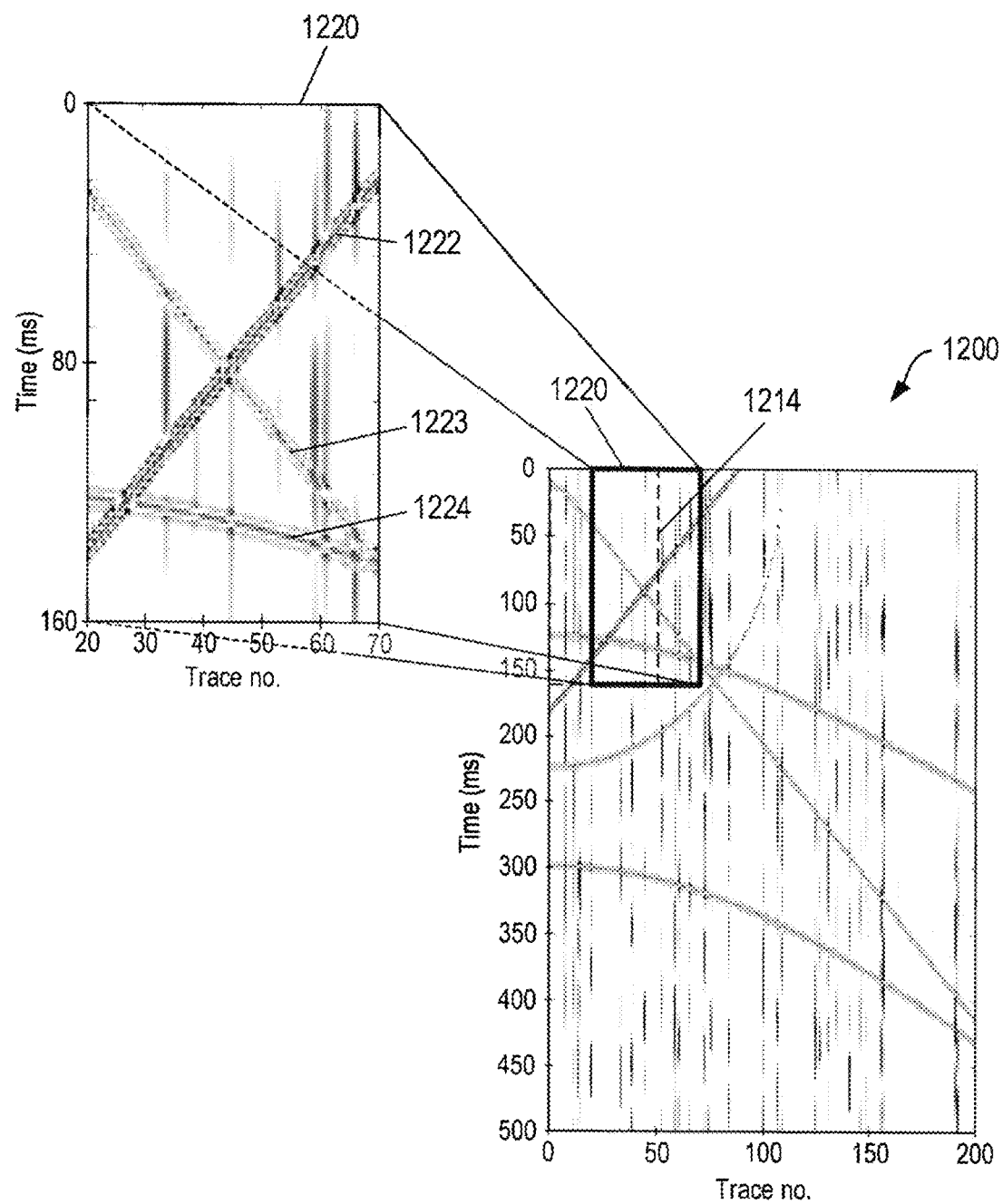

Processes and systems reconstruct low frequency signal of seismic data in overlapping sliding space-time windows of the seismic data. FIGS. 12A-12C show an example of locations of a sliding space-time window used to extract seismic data from an example shot gather 1200 contaminated with low frequency noise. Horizontal axis 1202 represents trace numbers that correspond to receiver coordinates. Vertical axis 1204 represents a time interval in which the seismic data of the shot gather is recorded. Curve 1206 represents the signal that is recorded by the receivers that correspond to the trace numbers. Curves 1208 and 1210 represent reflections from interfaces within a subterranean formation that are caused by the firing of an acoustic source. Vertical striations, such as striations 1212, represent the low frequency noise of less than 4 Hz that contaminates the seismic data in the gather 1200. FIG. 12B shows an example of a space-time window 1214. Directional arrows 1216 and 1218 represent directions the space-time window is moved within the shot gather 1200. At each location of the space-time window, seismic data within the space-time window is extracted and the low frequency signal of the seismic data is reconstructed as described above with reference to FIG. 10. In FIG. 12C, the space-time window 1214 in FIG. 12B is represented by a dashed-line rectangle. Rectangle 1220 represents a location of the sliding space-time window that overlaps the previous location of the space-time window 1214. Seismic data with spatial and time coordinates within the magnified view of the seismic data that lie within the boundaries of the space-time window 1220 are extracted from the shot gather 1200.

In one implementation, the seismic data within the space-time window is transformed from the space-time domain to the tau-p domain (i.e., intercept-slowness domain) using a Radon transform. Tau-p domain is an example of an intermediate domain. Tau is an intercept time denoted by τ, and p is an inverse velocity or slowness (i.e., time/distance). The reflections recorded in the space-time window are nearly linear reflections. For example, the reflections 1222-1224 in the space-time window 1220 of FIG. 12C are nearly linear. The Radon transform has the advantage of mapping wavelets of linear reflections from the space-time domain to different slowness traces in the tau-p domain. In other words, the Radon transform also maps linear moveout into a single slowness trace.

Figure 13:
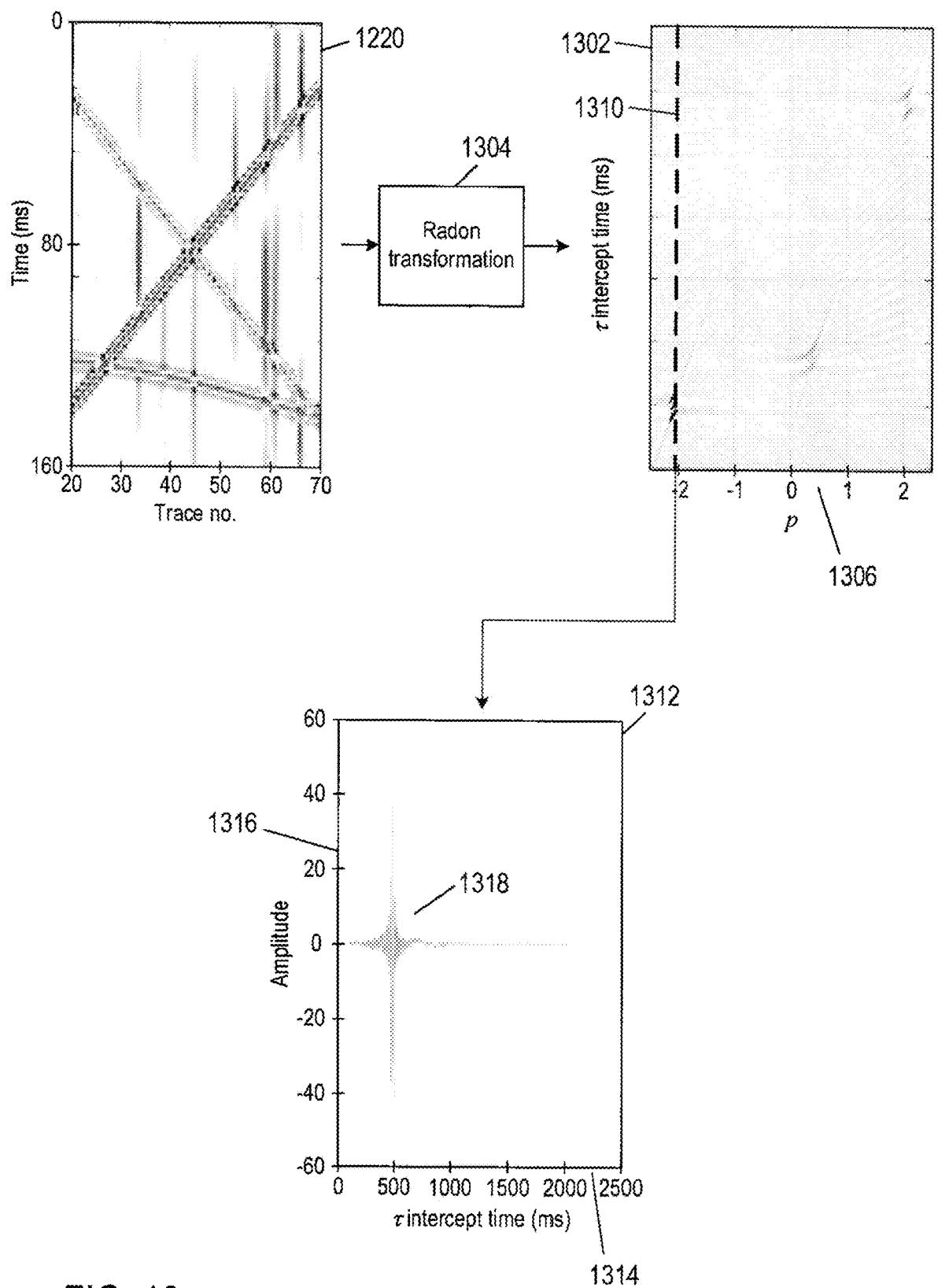
FIG. 13 shows seismic data in a space-time window transformed into a tau-p window using a Radon transform.

FIG. 13 shows the seismic data in the space-time window 1220 transformed into a tau-p window 1302 using the Radon transform 1304. Horizontal axis 1306 represents a slowness range of values (i.e., inverse velocity range). Vertical axis 1308 represents intercept time τ. Low frequency noise that contaminates the seismic data in the space-time window 1220 is also present in the tau-p data in the tau-p window 1302. For each slowness value in the tau-p window 1302, a slowness time trace is extracted from the tau-p window. A slowness time trace comprises the intercept times and associated amplitudes for a particular slowness value. For example, a dashed line 1310 represents a slowness time trace at a slowness value of about −2 ms/km of the tau-p window 1302. FIG. 13 shows a plot 1312 of the slowness time trace 1310 extracted from the tau-p window 1302 for the slowness value of about −2 ms/km. Horizontal axis 1314 corresponds to the whole of intercept times along the axis 1308 of the tau-p window 1302. Vertical axis 1316 is a range of amplitudes associated with the slowness time trace 1310 at the slowness of about −2 ms/km. Curve 1318 represents amplitudes over the intercept time axis 1314. The intercept times in the slowness time trace 1310 are transformed using a Fourier transform from the time domain to the frequency domain. The slowness time trace 1310 is transformed to the frequency domain using a Fourier transform. Reconstruction is performed on the trace in the frequency domain as described above with reference to FIG. 10.

Figure 14A:
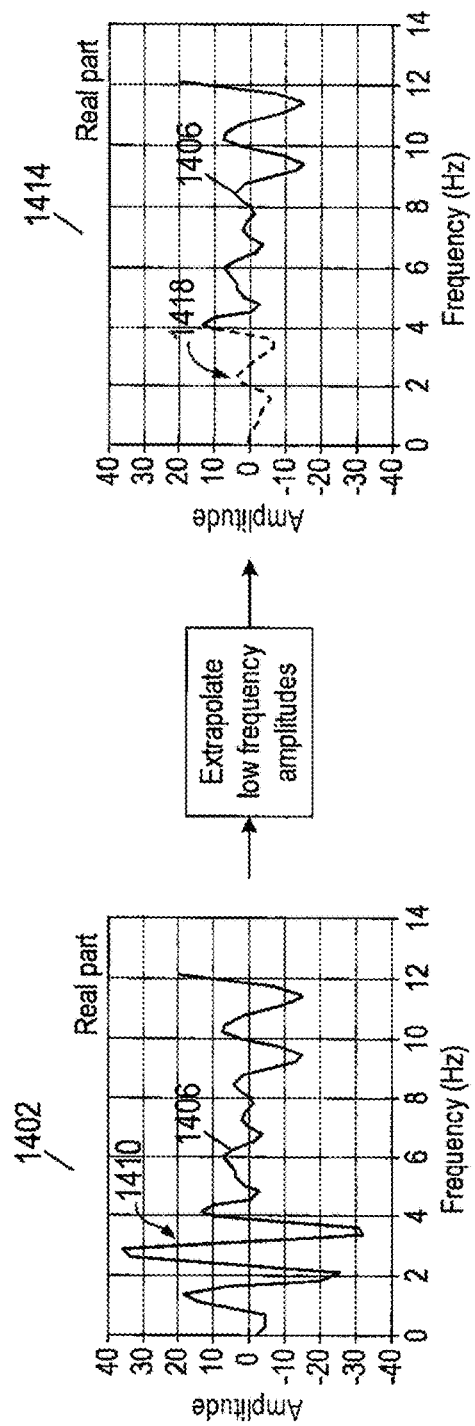
FIGS. 14A-14B show example plots of real and imaginary parts in the frequency domain of a trace of the tau-p window in FIG. 13.
Figure 14B:
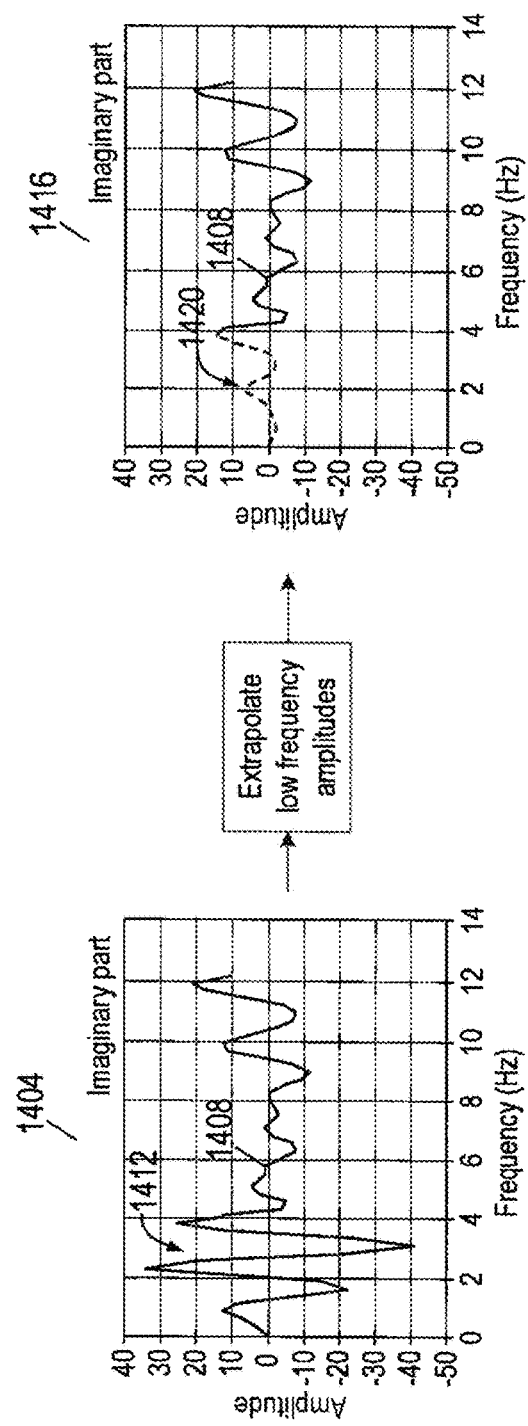

FIGS. 14A-14B show example plots 1402 and 1404 of the real and imaginary parts, respectively, of the slowness time trace 1310 in the frequency domain. Curve 1406 represents the real part of the slowness time trace 1310 transformed to the frequency domain. Curve 1408 represents the imaginary part of the slowness time trace 1310 transformed to the frequency domain. The real and imaginary parts both show corresponding exaggerated amplitude oscillations 1410 and 1412 below about 4 Hz (i.e., low frequency band of 0-4 Hz) due to low frequency noise contamination of the seismic data in the space-time window 1220. FIGS. 14A-14B show example plots 1414 and 1416 of real and imaginary parts of the trace reconstructed over the low frequency band in the frequency domain as described above with reference to FIG. 10. In other words, the low frequency noise contaminated amplitudes in corresponding plots 1402 and 1404 have been replaced by extrapolated amplitudes as described above with reference to FIG. 10. FIG. 14A represents how performing extrapolation of low frequency amplitudes as described above with reference to FIG. 10 gives low frequency corrected amplitudes represented by dashed curve 1418 in plot 1414. FIG. 14B represents how performing extrapolation of low frequency amplitudes as described above with reference to FIG. 10 gives low frequency corrected amplitudes represented by dashed curve 1420 in plot 1416.

Figure 15:
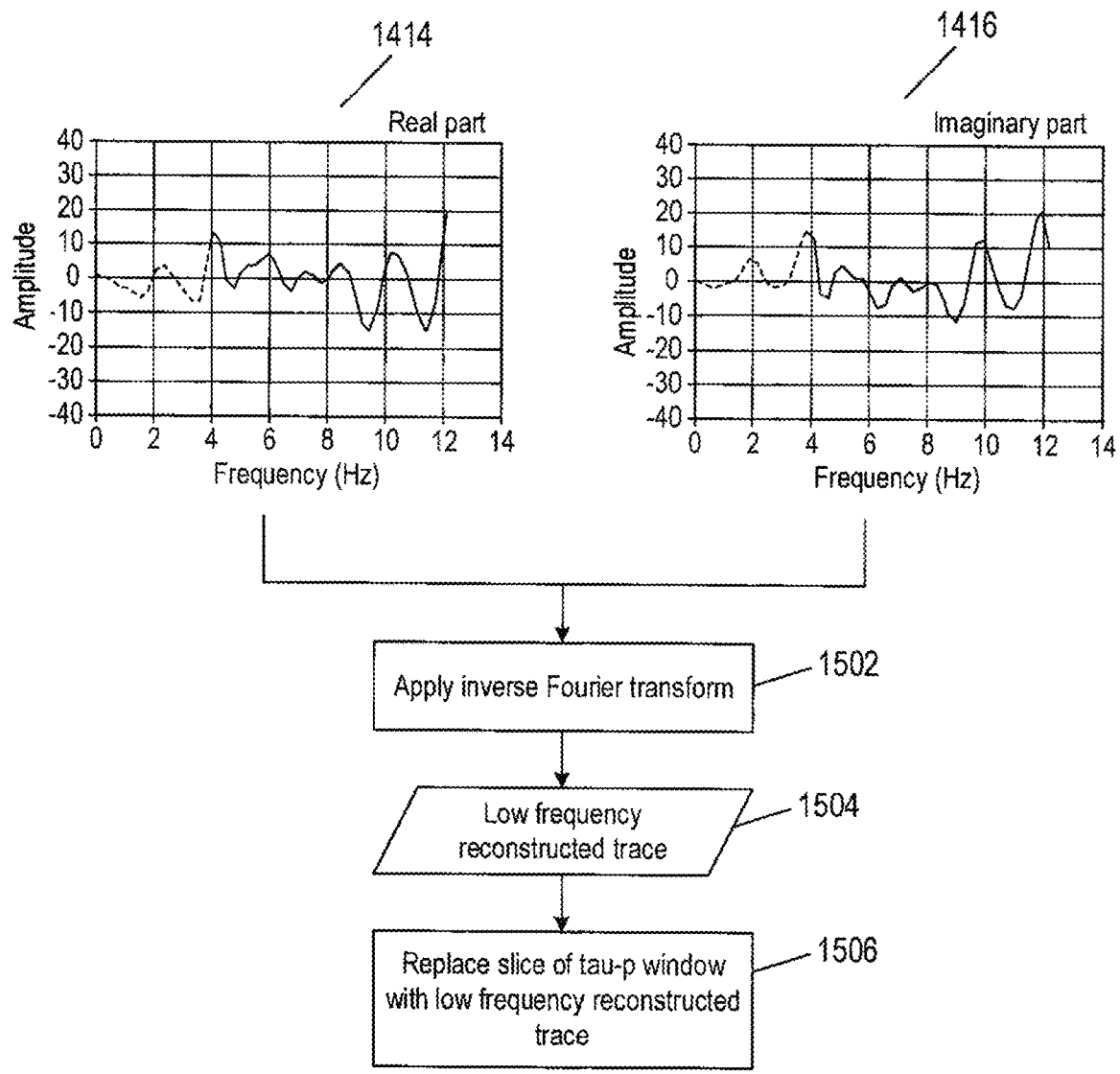
FIG. 15 shows a process of obtaining a low frequency reconstructed trace.

FIG. 15 shows a process of obtaining a low frequency reconstructed slowness time trace. In block 1502, inverse Fourier transform is used to obtain a low frequency reconstructed slowness time trace 1504. The low frequency reconstructed slowness time trace 1504 corresponds to the slowness time trace 1310 in FIG. 13 with the low frequency noise contamination below 4 Hz removed. In block 1506, the slowness time trace 1310 in the tau-p window 1302 is deleted and replaced by the low frequency reconstructed slowness time trace 1504.

Figure 16:
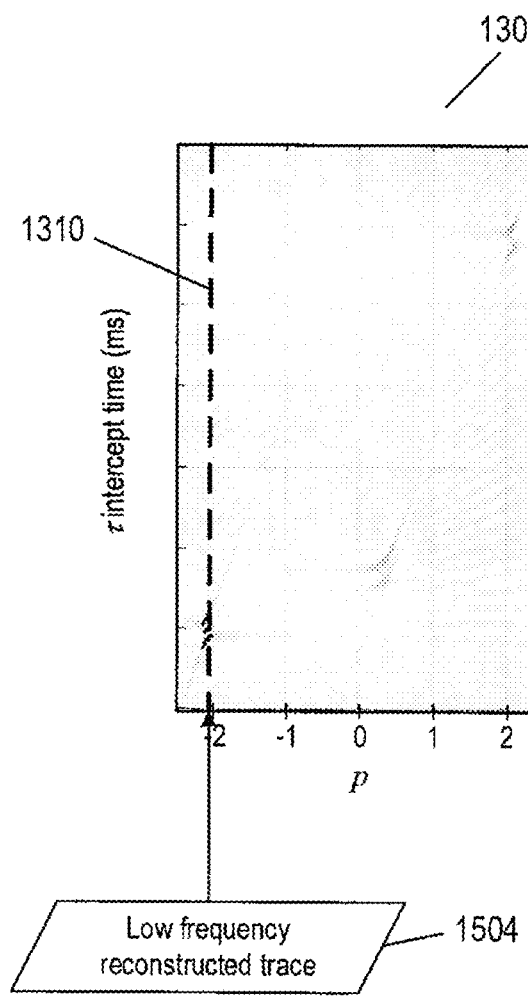
FIG. 16 shows the low frequency reconstructed trace inserted into the tau-p window at the intercept times and slowness value of a corresponding low frequency noise contaminated trace.

FIG. 16 shows the low frequency reconstructed slowness time trace 1504 inserted into the tau-p window 1302 at the intercept times and slowness value represented by dashed slowness time trace 1310. For each slowness value of the tau-p window 1302, the process described above with reference to FIGS. 14A-15 is performed for a corresponding low frequency noise contaminated slowness time trace, producing a low frequency reconstructed slowness time trace that replaces the low frequency noise contaminated slowness time trace in the tau-p window 1302. When the process described above with reference to FIGS. 14A-15 has been performed for each slowness value in the tau-p window, the resulting tau-p window contains low frequency reconstructed slowness time traces that are free of the low frequency noise contamination.

Figure 17:
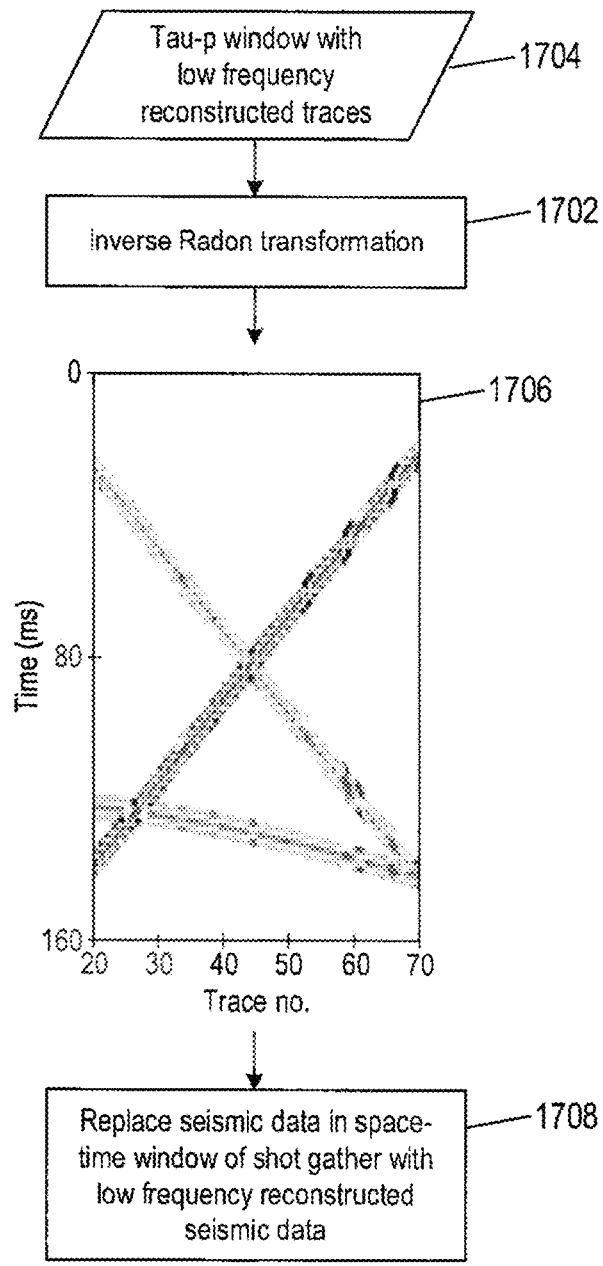
FIG. 17 show a process of replacing low frequency noise contaminated seismic data in a space-time window of with low frequency reconstructed seismic data.

FIG. 17 show a process of replacing the low frequency noise contaminated seismic data in the space-time window 1220 with low frequency reconstructed seismic data. In block 1702 of FIG. 17, the inverse Radon transform is applied to the tau-p window that contains low frequency reconstructed slowness time traces 1704 to obtain low frequency reconstructed seismic data in a space-time window 1706. Comparison of the low frequency reconstructed seismic data in the space-time window 1706 with the low frequency noise contaminated seismic data in the space-time window 1220 of FIG. 12C reveals that the low frequency noise is essentially removed. In block 1708, the low frequency reconstructed seismic data in the space-time window 1706 replaces the seismic data in the space-time window 1220 of FIG. 12C. The process described above with reference to FIGS. 13-17 is applied to each of the overlapping space-time windows of the shot gather 1200 to obtain low frequency reconstructed seismic data.

Processes and systems described above are not limited to using the linear autoregressive model of Equations (4a)-(5). In another implementation, rather than using the linear autoregressive model of Equations (4a)-(5), a nonlinear autoregressive model with quadratic terms may be used and is given by:

$$y(n) = \sum_{k=1}^{K} \alpha_k^{(n)} y(n+k) + \beta_k^{(n)} y^2(n+k) + \varepsilon(n) \quad (6)$$

where $\alpha_1^{(n)}, \alpha_2^{(n)}, \ldots, \alpha_K^{(n)}$ are LPCs; and
$\beta_1^{(n)}, \beta_2^{(n)}, \ldots, \beta_K^{(n)}$ are quadratic prediction coefficients ("QPCs").

The number of terms K in Equation (6) is selected by a user. For example, a user may select a value of K greater than or equal to 7. The LPCs and the QPCs in Equation (6) are estimated by solving a least squares minimization of the total error given by $$\left(\vec{\alpha}^{(n)}, \vec{\beta}^{(n)}\right) = \underset{\vec{\alpha}^{(n)},\vec{\beta}^{(n)}}{\operatorname{argmin}} \sum_{m=n+1}^{n+L} \left| y(m) - \sum_{k=1}^{K} \alpha_k^{(n)} y(m+k) + \beta_k^{(n)} y^2(n+k) \right|^2 \quad (7)$$

Minimizing the cost function in Equation (7) leads to solving for the estimated LPCs and QPCs according to the following Yule-Walker set of equations:

$$\begin{bmatrix} P_{11}^{(n)} & P_{12}^{(n)} \\ P_{12}^{(n)T} & P_{22}^{(n)} \end{bmatrix} \begin{bmatrix} \hat{\vec{\alpha}}^{(n)} \\ \hat{\vec{\beta}}^{(n)} \end{bmatrix} = \begin{bmatrix} \vec{c}_1^{(n)} \\ \vec{c}_2^{(n)} \end{bmatrix} \quad (8a)$$

where superscript T represents matrix transpose. The matrix elements of the estimated LPCs and QPCs of Equation (8a) are given by $$\begin{bmatrix} \hat{\vec{\alpha}}^{(n)} \\ \hat{\vec{\beta}}^{(n)} \end{bmatrix} = \begin{bmatrix} \hat{\alpha}_1^{(n)} \\ \vdots \\ \hat{\alpha}_K^{(n)} \\ \hat{\beta}_1^{(n)} \\ \vdots \\ \hat{\beta}_K^{(n)} \end{bmatrix} \quad (8b)$$

$$P_{11} = \begin{bmatrix} R(0) & R(1) & \cdots & R(K-1) \\ R(-1) & R(0) & \cdots & R(K-2) \\ \vdots & & \ddots & \vdots \\ R(1-K) & R(2-K) & \cdots & R(0) \end{bmatrix} \quad (8c)$$

$$P_{12} = \begin{bmatrix} U(0) & U(1) & \cdots & U(K-1) \\ U(-1) & U(0) & \cdots & U(K-2) \\ \vdots & & \ddots & \vdots \\ U(1-K) & U(2-K) & \cdots & U(0) \end{bmatrix} \quad (8d)$$

$$P_{22} = \begin{bmatrix} Q(0) & Q(1) & \cdots & Q(K-1) \\ Q(-1) & Q(0) & \cdots & Q(K-2) \\ \vdots & & \ddots & \vdots \\ Q(1-K) & Q(2-K) & \cdots & Q(0) \end{bmatrix} \quad (8e)$$

$$\vec{c}_1^{(n)} = \begin{bmatrix} R(-1) \\ R(-2) \\ \vdots \\ R(-K) \end{bmatrix} \quad (8f)$$

$$\vec{c}_2^{(n)} = \begin{bmatrix} Q(-1) \\ Q(-2) \\ \vdots \\ Q(-K) \end{bmatrix} \quad (8g)$$

with matrix elements given by $$R(i) = \sum_{m=n+1}^{n+L} y(m+i) y^*(m) \quad (8h)$$

$$U(i) = \sum_{m=N+1}^{n+L} y(m+i)(y^*(m))^2 \quad (8i)$$

$$Q(i) = \sum_{m=n+1}^{n+L} (y(m+i))^2 (y^*(m))^2 \quad (8j)$$

Once the LPCs and QPCs are estimated using Equations (8a)-(8j), the non-linear autoregressive model that is used to backward extrapolate low frequency complex parts of seismic data from higher frequency complex parts using $$y(n) = \sum_{k=1}^{K} \hat{\alpha}_k^{(n)} y(n+k) + \hat{\beta}_k^{(n)} y^2(n+k) \qquad (9)$$

The non-linear autoregressive model in Equation (9) can be used to perform extrapolation as described above with reference to FIG. 10.

Implementations are not limited to the linear autoregressive model of Equation (5) and the non-linear autoregressive model of Equation (9). Higher order non-linear autoregressive models may be used, such as a non-linear autoregressive model with third order and even fourth order terms, for backward extrapolation as described above.

Note that for backward extrapolation, extrapolated values at larger frequencies in the low frequency band are used to calculate extrapolated values for decreasing frequencies. For example, extrapolated values at larger frequencies in the low frequency band are used to calculate the LPCs $\hat{\alpha}_k^{(n-)}, \ldots, \hat{\alpha}_k^{(n-K)}$ of Equation (5) decreasing frequencies in the low frequency band, and extrapolated values at larger frequencies in the low frequency band are used to calculate the LPCs and QPCs $(\vec{\alpha}^{(n-1)}, \hat{\beta}^{(n-1)}), \ldots, (\vec{\alpha}^{(n-K)}, \hat{\beta}^{(n-k)})$ of Equation (9) decreasing frequencies in the low frequency band.

Computer-implemented processes described above are not limited to transforming the seismic data in space-time windows from the space-time domain to the tau-p domain. In another implementation, rather that performing the operations described above in FIGS. 13-15 and FIG. 19 in the tau-p domain, the seismic data in the space-time windows may be transformed from the space-time domain to another intermediate domain, such as frequency-slowness domain, a frequency-velocity domain, and a frequency-wavenumber domain. For the frequency-slowness domain, extrapolation as described above with reference to Equation (10) is applied separately to each of the slowness values. For the frequency-velocity domain, extrapolation as described above with reference to Equation (10) is applied separately to each of the velocity values. For the frequency-velocity domain, extrapolation as described above with reference to Equation (10) is applied separately to each of the wavenumber values.

Figure 18:
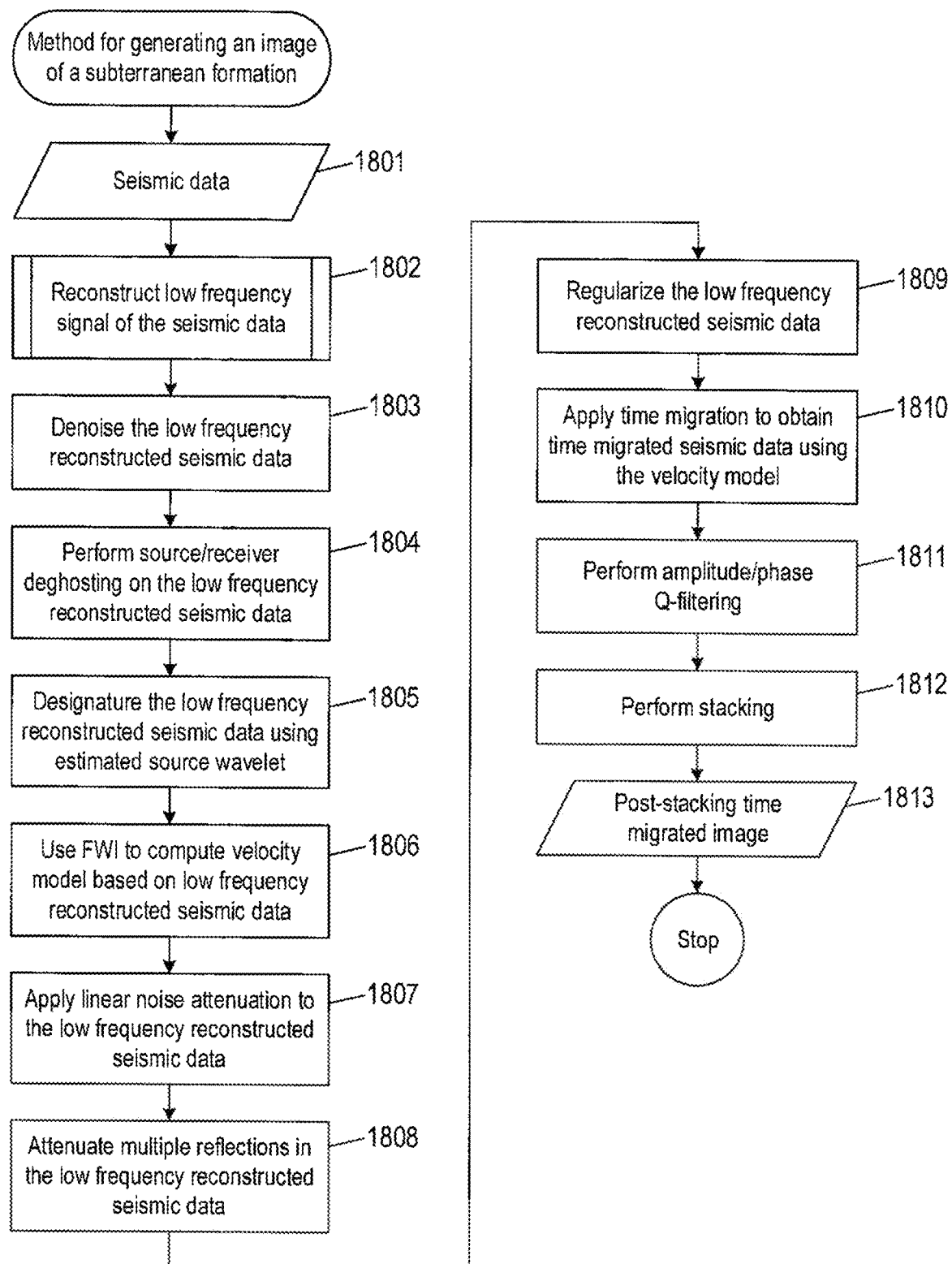
FIG. 18 is a flow diagram of a process for generating an image of a subterranean formation from seismic data recorded in a marine survey.

FIG. 18 is a flow diagram of a process for generating an image of a subterranean formation from seismic data recorded in a marine survey. In block 1801, seismic data is read from one or more data storage devices. The seismic data may have been recorded in a marine seismic survey or in a land-based seismic survey. For example, the recorded seismic data may be a shot gather, common-receiver gather, or a common-midpoint gather. In block 1802, a "reconstruct low frequency signal of the seismic data" process is performed to obtain low frequency reconstructed seismic data as described above. An example implementation of the "reconstruct low frequency signal of the seismic data" procedure is described below with reference to FIG. 19. In block 1803, the low frequency reconstructed seismic data is denoised to remove incoherent or random noise. In block 1804, source/receiver deghosting is performed to separate the low frequency reconstructed seismic data into upgoing and downgoing wavefield components. The downgoing wavefields record source ghosts created by acoustic reflections from the free surface. The operations represented by blocks 1805-1811 below are performed on the upgoing component of the low frequency reconstructed seismic data (i.e., the low frequency reconstructed seismic data has been deghosted). In block 1805, an estimated source wavelet that approximates the source signal output from the source is produced. The estimate source wavelet is used to designate the low frequency reconstructed seismic data. In block 1806, a velocity model is computed based on low frequency reconstructed seismic data using full-waveform inversion ("FWI") in a lower frequency band. For example, the lower frequency band (e.g., seismic data with frequencies below 20 Hz) of the low frequency reconstructed seismic are input to the FWI to obtain the velocity model. In block 1807, linear noise attenuation may be performed on the low frequency reconstructed seismic data by modeling linear noise in the low frequency reconstructed seismic data and subtracting the linear noise model from the low frequency reconstructed seismic data. In block 1808, multiple reflections are attenuated in the low frequency reconstructed seismic data output from block 1806. The resulting low frequency reconstructed seismic data represents the primary wavefields reflected upward from the subterranean formation. In block 1809, regularization and interpolation are applied to the low frequency reconstructed seismic data. Because the receivers move during seismic data recording, the receiver coordinates of the seismic traces of are not regularly spaced during recording of the seismic data. Regularization corrects irregularly spaced receiver coordinates of the traces to regularly spaced grid points. Interpolation replaces corrupted traces or fills in missing seismic traces, such as creating traces of seismic data in the crossline direction. In block 1810, migration is applied to the seismic data in the space-time coordinate system to obtain time migrated seismic data (i.e., image of the subterranean formation). Time migration techniques use the velocity model obtained in block 1806 to re-locate reflection events recorded in the low frequency reconstructed seismic data in time, thereby the resulting images accurately represent dips and orientations of interfaces within the subterranean formation. In block 1811, amplitude and phase Q filtering are performed to enhance resolution of the image obtained in block 1810. In block 1812, stacking is applied to the time migrated image to obtain a post-stacked time migrated image 1813.

Figure 19:
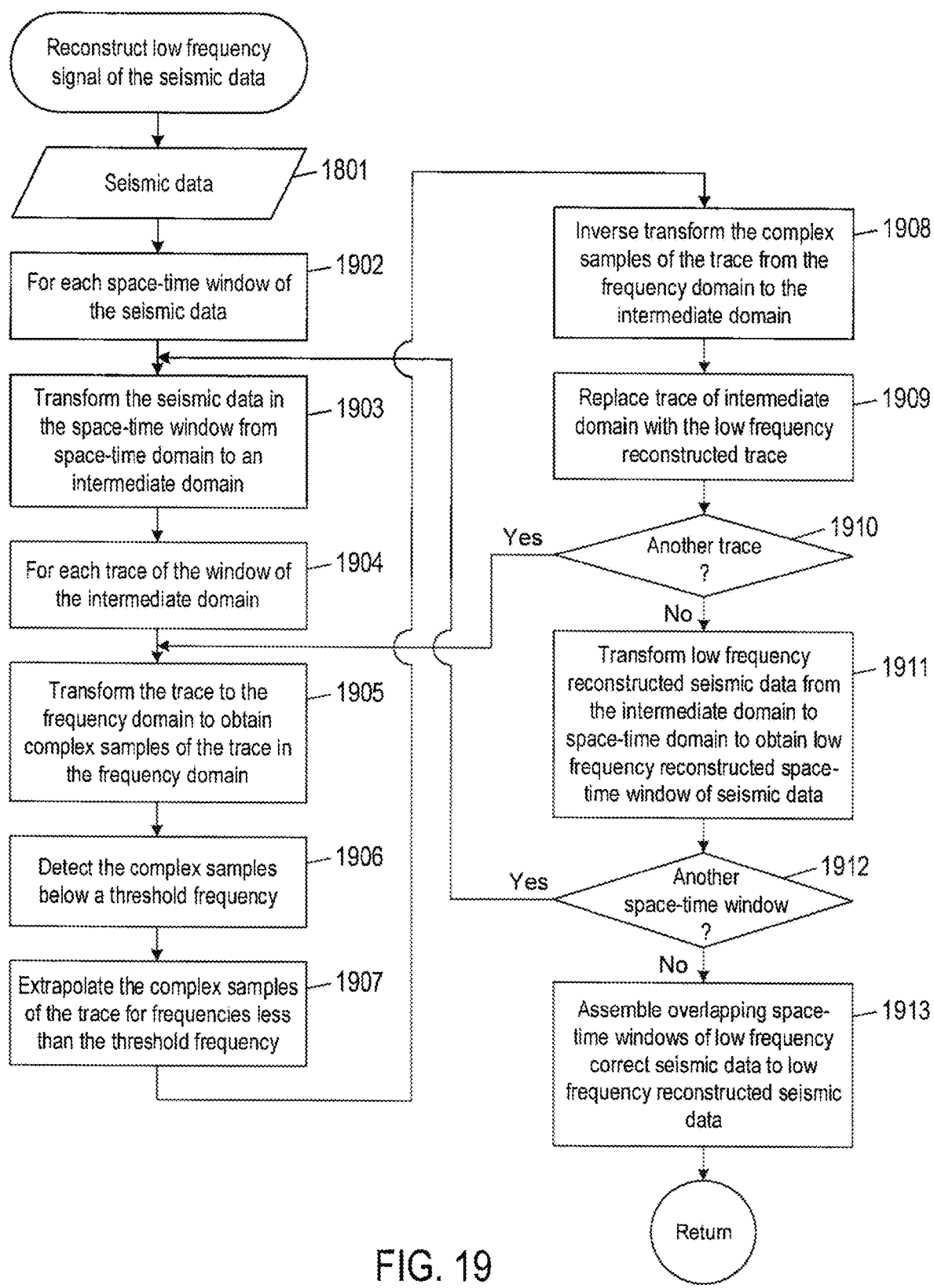
FIG. 19 is a flow diagram illustrating an example implementation of the "reconstruct low frequency signal of the seismic data" procedure performed in FIG. 18.

FIG. 19 is a flow diagram illustrating an example implementation of the "reconstruct low frequency signal of the seismic data" procedure performed in block 1802 of FIG. 18. A loop beginning with block 1902, repeats the operations represented by blocks 1903-1911 for each location of a sliding space-time window of the seismic data as described above with reference to FIGS. 12A-12C. In block 1903, the seismic data in the space-time window is transformed from the space-time domain to an intermediate domain. For example, the intermediate domain can be the tau-p domain (i.e., intercept time-slowness domain) to obtain a corresponding window in the tau-p domain, as described above with reference to FIG. 13. In other implementations, the intermediate domain may be the frequency-slowness domain, the frequency-velocity domain, or the frequency-wavenumber domain. A loop beginning with block 1904, repeats the operations represented by blocks 1905-1909 for each trace of the window in the intermediate domain, as described above with reference to FIG. 13. In block 1905, the trace is transformed from the intermediate domain to the frequency domain as described above with reference to FIG. 14 to obtain complex samples of the trace in the frequency domain. In block 1906, amplitudes of the complex samples with frequencies below a threshold frequency (i.e., maximum frequency $f_{max}$ of a low frequency band that contains low frequency noise contamination) are detected. In block 1907, the complex samples with frequencies less than the maximum frequency are extrapolated as described above with reference to FIG. 10 to obtain low frequency extrapolated complex samples in the frequency domain. In block 1908, the low frequency corrected complex samples are transformed from the frequency domain to the time domain as described above with reference to FIG. 15 to obtain a low frequency reconstructed trace in the intermediate domain. In block 1909, the trace with low frequency noise contamination is deleted from the data storage and replaced by the low frequency reconstructed trace in block 1908 as described above with reference to FIG. 16. In decision block 1910, the computational operations represented by blocks 1905-1909 are repeated for another trace of the window until all the traces have been reconstructed as low frequency reconstructed traces that are free of low frequency noise in the low frequency band. In block 1911, the low frequency reconstructed seismic data of the window are transformed to space-time domain to obtain a low frequency reconstructed space-time window of seismic data as described above with reference to FIG. 17. In decision block 1912, the computational operations represented by blocks 1903-1911 are repeated for another space-time window of the seismic data. In block 1913, the low frequency reconstructed space-time windows of seismic data are assembled to obtain low frequency reconstructed seismic data that is free of the low frequency noise in the seismic data.

Figure 20:
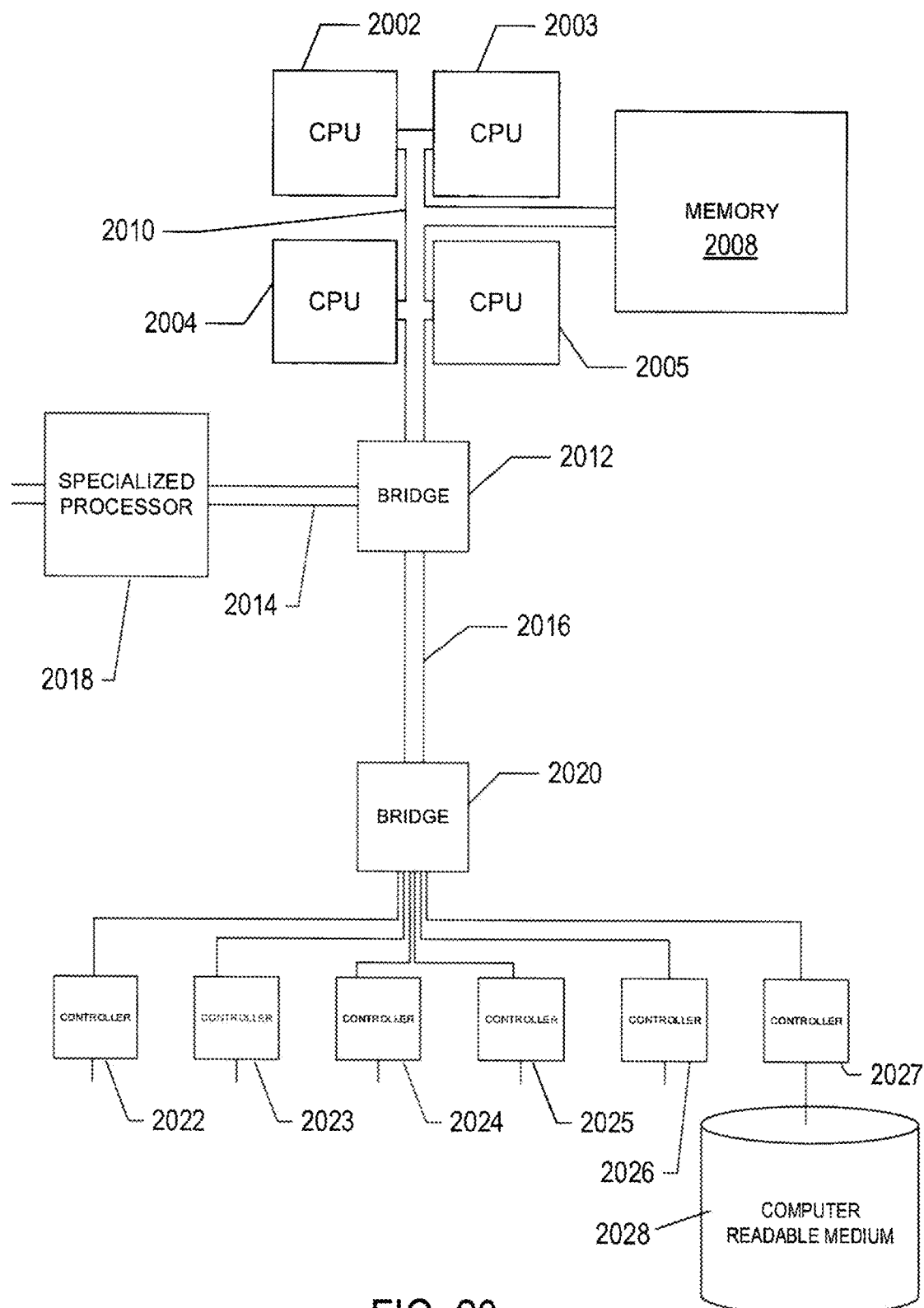
FIG. 20 shows an example of a computer system that executes efficient methods for performing imaging of a subterranean formation as described above.

FIG. 20 shows an example of a computer system that executes efficient methods for performing imaging of a subterranean formation as described above with reference to FIGS. 18-19. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2002-2005, one or more electronic memories 2008 interconnected with the CPUs by a CPU/memory-subsystem bus 2010 or multiple busses, a first bridge 2012 that interconnects the CPU/memory-subsystem bus 2010 with additional busses 2014 and 2016, or other types of high-speed interconnection media, including multiple, high-speed serial interconnects. The busses or serial interconnections, in turn, connect the CPUs and memory with specialized processors, such as a graphics processor 2018, and with one or more additional bridges 2020, which are interconnected with high-speed serial links or with multiple controllers 2022-2027, such as controller 2027, that provide access to various different types of computer-readable media, such as computer-readable medium 2028, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2028 is a data-storage device, including electronic memory, optical or magnetic disk drive, USB drive, flash memory and other such data-storage device. The computer-readable medium 2028 can be used to store machine-readable instructions that encode computational methods for performing imaging of a subterranean formation as described above and can be used to store encoded data, during store operations, and from which encoded data can be retrieved, during read operations, by computer systems, data-storage systems, and peripheral devices.

The processes and systems disclosed herein may be used to manufacture a geophysical data product indicative of properties of a subterranean formation. The properties include structure, composition, and lithology of a subterranean formation. A geophysical data product may be manufactured by using the processes and systems described herein to generate geophysical data product and store the geophysical data product in the computer-readable medium 2028. The geophysical data product may be a velocity model of a subterranean formation, or an image of the subterranean formation computed using the processes and systems described herein. The geophysical data product may be produced offshore (i.e., by equipment on the survey vessel) or onshore (i.e., at a computing facility on land), or both.

Simulation Results

FIGS. 21-24 show simulation results that reveal advantages of the processes for reconstructing seismic data that is free of low frequency noise from low frequency noise contaminated seismic described herein over conventional approaches to attenuating low frequency noise in the seismic data.

Figure 21:
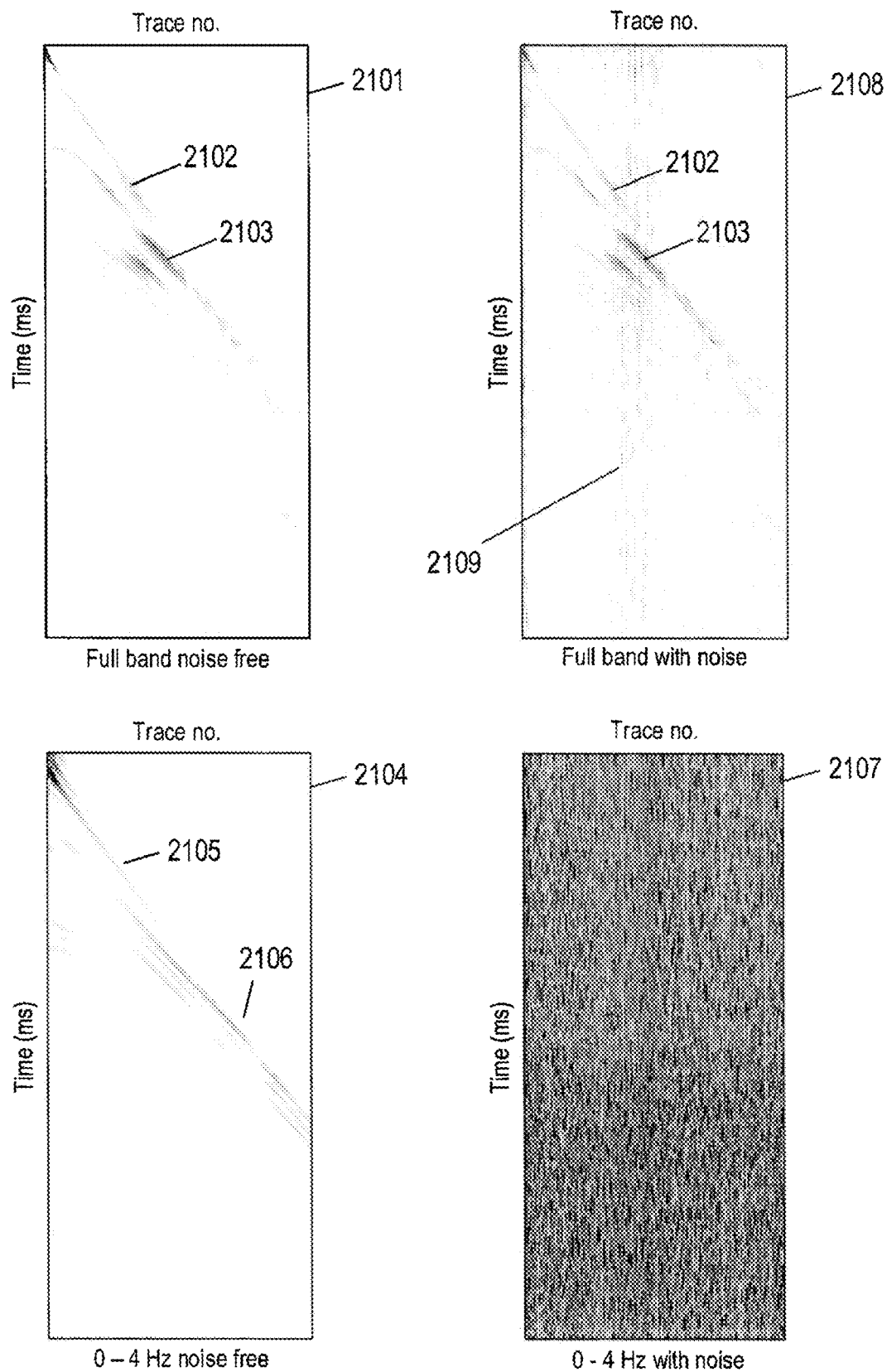
FIGS. 21-24 show simulation results that reveal advantages of processes for reconstructing seismic data that is free of low frequency noise from low frequency noise contaminated seismic.

FIG. 21 shows a plot 2101 of a shot gather of seismic data over a full frequency band that is free of low frequency noise contamination. The plot 2101 contains reflections 2102 and 2103. FIG. 21 shows a plot 2104 of the same shot gather of the seismic data with frequencies in the low frequency band of 0-4 Hz. Plot 2104 of the shot gather shows reflections 2105 and 2106 with frequencies in the low frequency band of 0-4 Hz. FIG. 21 shows a plot 2107 of the seismic data in plot 2104 with low frequency noise added to the low frequency band of 0-4 Hz. The low frequency noise blocks out reflections clearly shown in plot 2104. FIG. 21 shows a plot 2108 of the seismic data in plot 2101 with low frequency noise contamination from the low frequency band 0-4 Hz in plot 2107. The reflections 2102 and 2103 are visible but the seismic data is contaminated with the low frequency noise as indicated by the vertical striations, such as striations 2109, which are not present in the noise free seismic data of plot 2101.

Figure 22:
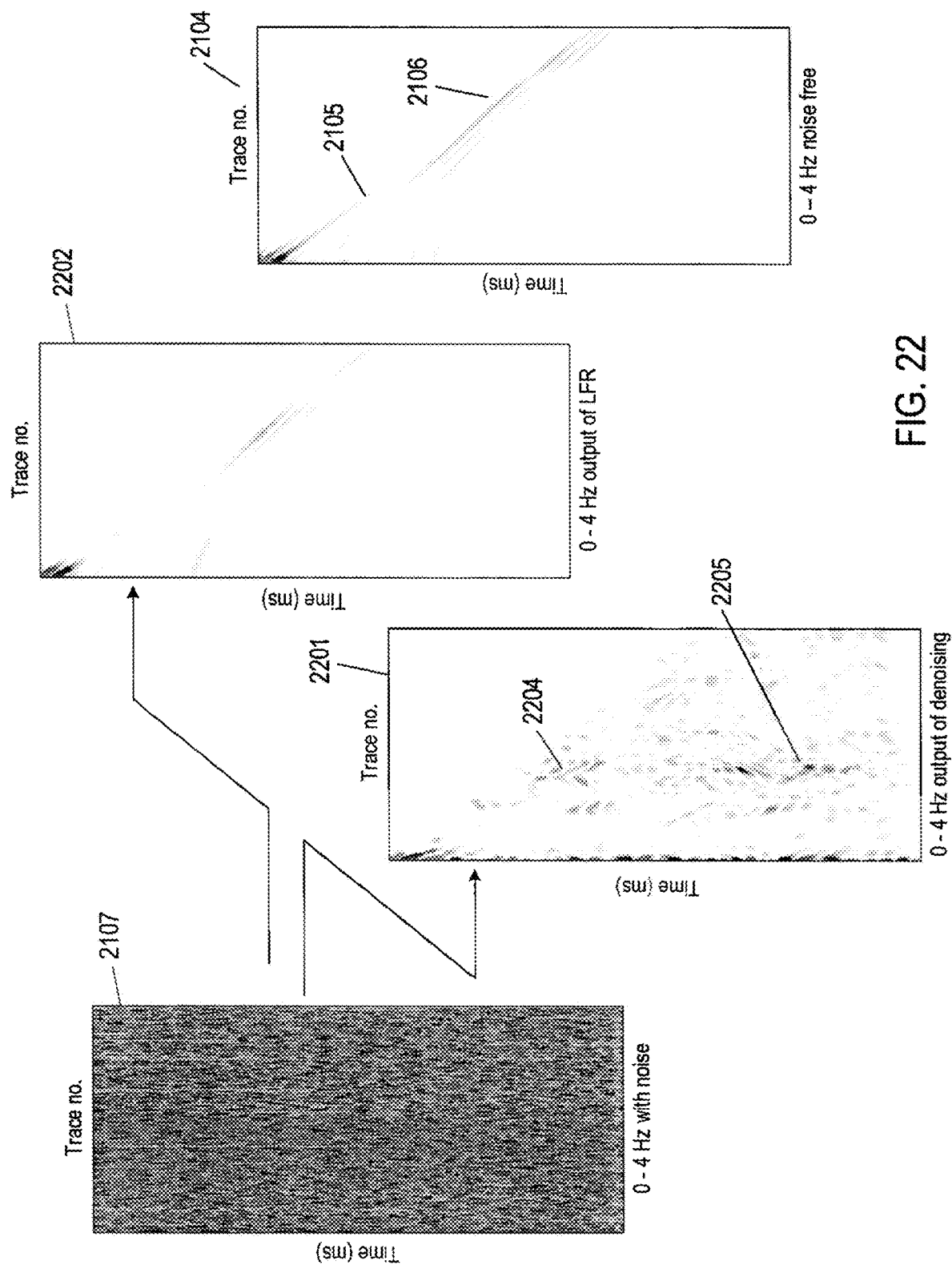

FIG. 22 shows results obtained from applying a conventional noise attenuation technique to the low frequency noise contaminated seismic data in plot 2107 and results obtained from applying the reconstructing seismic data as described above to the same low frequency noise contaminated seismic data in plot 2107. Plot 2201 shows the seismic data in the low frequency band of 0-4 Hz after applying conventional noise attenuation. Plot 2202 shows low frequency reconstructed seismic data in the low frequency band of 0-4 Hz after applying the processes for reconstructing seismic data in the low frequency band as described above. FIG. 22 also shows the noise free plot 2104 of FIG. 21 for comparison with plots 2201 and 2202. Plot 2201 clearly shows ripples and waves, such as ripples and waves 2204 and 2205, which demonstrates that conventional noise attenuation has changed the low frequency signal thereby obscuring the reflections 2105 and 2106. By contrast, plot 2202 is free of the low frequency noise and retains the signal represented by the reflections 2105 and 2106. In other words, plot 2202 is free of the low frequency noise and closely matches the noise free seismic data in plot 2104.

Figure 23:
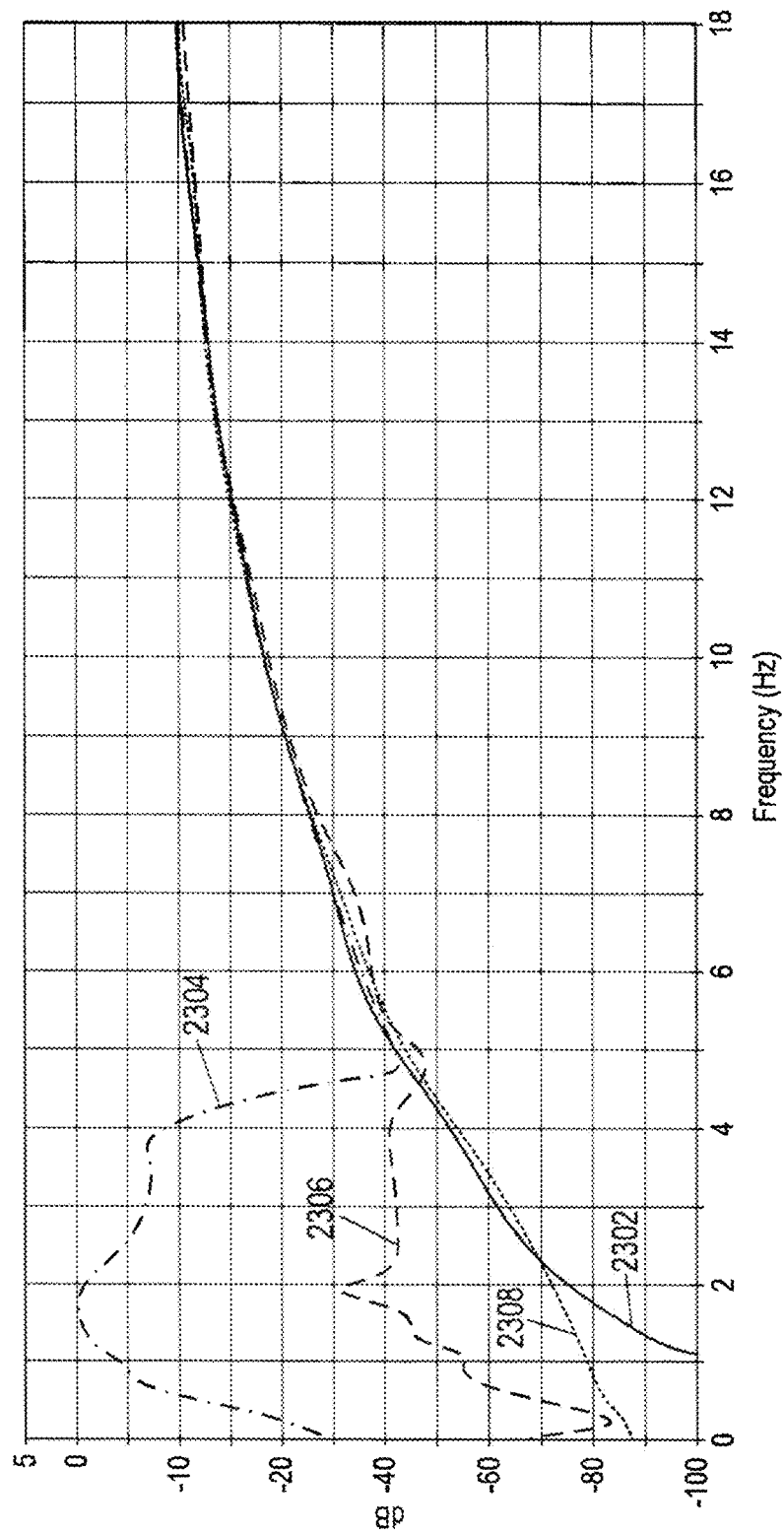

FIG. 23 shows a plot of amplitude spectra versus a range of frequencies for seismic data free of low frequency noise and with low frequency noise added. Solid curve 2302 represents the amplitude of seismic data that is free of low frequency noise over the range of frequencies. Dot dashed curve 2304 represents the amplitude range of the same seismic data with low frequency noise in the frequency band 0-5 Hz added. Dashed curve 2306 represents the amplitude range of seismic data obtained after applying conventional noise attenuation to the low frequency noise contaminated seismic data represented by curve 2304. Curve 2306 reveals that conventional noise attenuation removes only a portion of the low frequency noise. Dashed curve 2308 represents the amplitude range of seismic data obtained after applying the processes for reconstructing seismic data in the low frequency band as described above. Dashed curve 2308 reveals that the processes described above produces seismic data that is essential free of the low frequency noise contamination.

Figure 24:
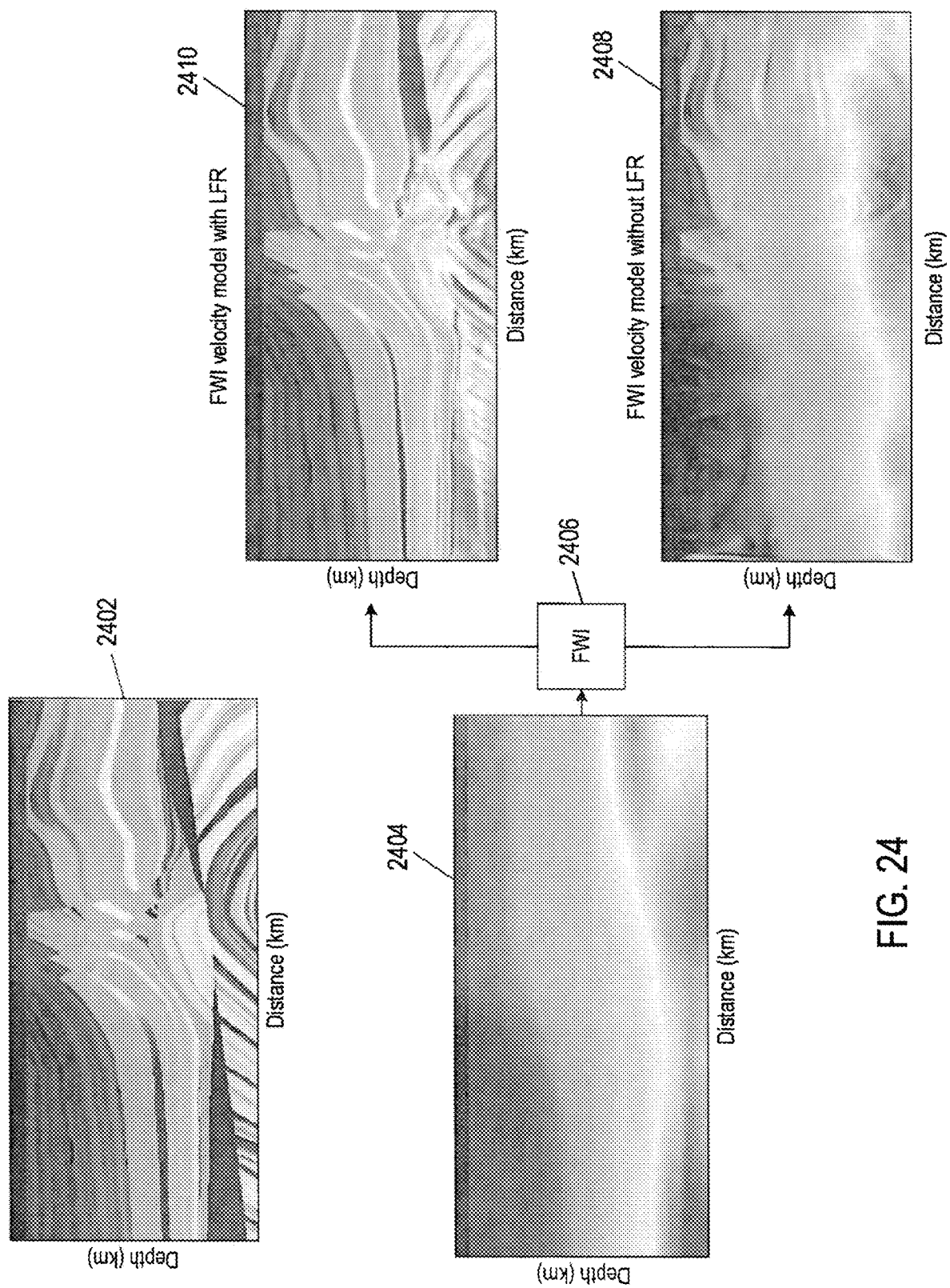

FIG. 24 shows the results of using FWI to obtain velocity models of a subterranean formation from seismic data that has been processed to attenuate low frequency noise contamination using conventional low frequency noise attenuation and the same seismic data that has been processed by reconstructing seismic data in the low frequency band as described above. FIG. 24 shows a true velocity model 2402 of the subterranean formation. Note that shading has been used to identify the different seismic velocities that correspond to different materials within the subterranean formation. The seismic velocities delineate the corresponding structures and layers of the subterranean formation. FIG. 24 also shows an initial velocity model of the subterranean formation that is input to FWI 2406. FIG. 24 show a velocity model 2408 output from the FWI 2406 for seismic data that was first processed to attenuate low frequency noise using a convention low frequency noise attenuation. By contrast, FIG. 24 show a velocity model 2410 output from the FWI 2406 for seismic data that was first processed by reconstructing seismic data in the low frequency band as described above. The velocity model 2410 more closely matches the true velocity model 2402 than the velocity model 2608 and clearly shows the delineations between layers and structures of different materials. A seismic image produced from the velocity model 2410 more accurately depicts the subterranean formation than would an image produced from the velocity model 2408.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a computer-implemented process for generating an image of a subterranean formation from seismic data recorded in a seismic survey of the subterranean formation, the improvement comprising:
   using an autoregressive model to reconstruct seismic data in a low frequency band of the seismic data from signals in the seismic data with relatively higher frequencies than the low frequency band to obtain low frequency reconstructed seismic data that is free of low frequency noise in the low frequency band;
   constructing a velocity model of the subterranean formation based on the low frequency reconstructed seismic data; and
   generating an image of the subterranean formation based on the velocity model and the low frequency reconstructed seismic data, the image revealing structures of the subterranean formation without contamination from the low frequency noise.

2. The process of claim 1 wherein using the autoregressive model to reconstruct seismic data in the low frequency band comprises:
   for each location of a sliding space-time window of the seismic data,
      transforming seismic data in the space-time window from a space-time domain to an intermediate domain, wherein the intermediate domain is one of a frequency-slowness domain, a frequency-velocity domain, and a frequency-wavenumber domain,
      using the autoregressive model to reconstruct seismic data in the low frequency band of each trace in the intermediate domain, and
      transforming the low frequency reconstructed traces to the space-time domain to obtain low frequency reconstructed seismic data in the space-time window.

3. The process of claim 1 wherein using the autoregressive model to reconstruct seismic data in the low frequency band comprises:
   for each location of a sliding space-time window of the seismic data,
      transforming seismic data in the space-time window from the space-time domain to an intermediate domain, wherein the intermediate domain is one of a frequency-slowness domain, a frequency-velocity domain, and a frequency-wavenumber domain, and
      for each trace in the intermediate domain,
         detecting amplitudes with frequencies in the low frequency band,
         reconstructing the amplitudes in the low frequency band to obtain a low frequency reconstructed trace using the autoregressive model, and
         replacing the trace with the low frequency reconstructed trace.

4. The process of claim 1 wherein using the autoregressive model to reconstruct seismic data in the low frequency band comprises:
   transforming the seismic data from the time domain to obtain transformed seismic data in an intermediate domain, wherein the intermediate domain is one of a frequency-slowness domain, a frequency-velocity domain, and a frequency-wavenumber domain;
   detecting amplitudes of the transformed seismic data with frequencies in a low frequency band;
   reconstructing amplitudes of traces in the low frequency band of the intermediate domain using the autoregressive model to obtain low frequency reconstructed seismic data in the intermediate domain; and
   inverse transforming the low frequency reconstructed seismic data in the space time domain.

5. The process of claim 1 wherein constructing the velocity model of the subterranean formation based on the low frequency reconstructed seismic data comprises performing full-waveform inversion with the low frequency reconstructed seismic data to obtain the velocity model free of contamination from the low frequency noise.

6. The process of claim 1 wherein the autoregressive model is one of a linear autoregressive model and a non-linear autoregressive model.

7. A computer system for generating an image of a subterranean formation from seismic data recorded in a seismic survey of the subterranean formation, the system comprising:
- one or more processors;
- one or more data-storage devices; and
- machine-readable instructions stored in the one or more data-storage devices that when executed using the one or more processors controls the system to perform operations comprising:
  - using an autoregressive model to reconstruct seismic data in a low frequency band of the seismic data from signals in the seismic data with relatively higher frequencies than the low frequency band to obtain low frequency reconstructed seismic data that is free of low frequency noise in the low frequency band;
  - constructing a velocity model of the subterranean formation based on the low frequency reconstructed seismic data; and
  - generating an image of the subterranean formation based on using the velocity model and the low frequency reconstructed seismic data, thereby the image revealing structures of the subterranean formation without contamination from the low frequency noise.

8. The computer system of claim 7 wherein using the autoregressive model to reconstruct seismic data in the low frequency band comprises:
- for each location of a sliding space-time window of the seismic data,
  - transforming seismic data in the space-time window from the space-time domain to an intermediate domain, wherein the intermediate domain is one of a frequency-slowness domain, a frequency-velocity domain, and a frequency-wavenumber domain,
  - using the autoregressive model to reconstruct seismic data in the low frequency band of each trace in the intermediate domain, and
  - transforming the low frequency reconstructed traces to the space-time domain to obtain low frequency reconstructed seismic data in the space-time window.

9. The computer system of claim 7 wherein using the autoregressive model to reconstruct seismic data in the low frequency band comprises:
- for each location of a sliding space-time window of the seismic data,
  - transforming seismic data in the space-time window from the space-time domain to an intermediate domain, wherein the intermediate domain is one of a frequency-slowness domain, a frequency-velocity domain, and a frequency-wavenumber domain, and
  - for each trace in the intermediate domain,
    - detecting amplitudes with frequencies in the low frequency band,
    - reconstructing the amplitudes in the low frequency band to obtain a low frequency reconstructed trace using the autoregressive model, and
    - replacing the trace with the low frequency reconstructed trace.

10. The computer system of claim 7 wherein using the autoregressive model to reconstruct seismic data in the low frequency band comprises:
- transforming the seismic data from the time domain to obtain transformed seismic data an intermediate domain, wherein the intermediate domain is one of an intercept time-slowness domain, a frequency-slowness domain, a frequency-velocity domain, and a frequency-wavenumber domain;
- detecting amplitudes of the transformed seismic data with frequencies in a low frequency band;
- reconstructing amplitudes of traces in the low frequency band of the intermediate domain using the autoregressive model to obtain low frequency reconstructed seismic data in the intermediate domain; and
- inverse transforming the low frequency reconstructed seismic data in the space time domain.

11. The computer system of claim 7 wherein constructing the velocity model of the subterranean formation based on the low frequency reconstructed seismic data comprises performing full-waveform inversion with the low frequency reconstructed seismic data to obtain the velocity model free of contamination from the low frequency noise.

12. The computer system of claim 7 wherein the autoregressive model is one of a linear autoregressive model and a non-linear autoregressive model.

13. A non-transitory computer-readable medium having machine-readable instructions encoded thereon for enabling one or more processors of a computer system to perform operations comprising:
- reconstructing seismic data in a low frequency band of the seismic data from signals in the seismic data with relatively higher frequencies than the low frequency band to obtain low frequency reconstructed seismic data that is free of low frequency noise in the low frequency band;
- constructing a velocity model of a subterranean formation based on the low frequency reconstructed seismic data; and
- generating an image of the subterranean formation based on the velocity model and the low frequency reconstructed seismic data.

14. The medium of claim 13 wherein reconstructing seismic data in the low frequency band comprises:
- for each location of a sliding space-time window of the seismic data,
  - transforming seismic data in the space-time window from the space-time domain to an intermediate domain, wherein the intermediate domain is one of a frequency-slowness domain, a frequency-velocity domain, and a frequency-wavenumber domain,
  - using an autoregressive model to reconstruct seismic data in the low frequency band of each trace in the intermediate domain, and
  - transforming the low frequency reconstructed traces to the space-time domain to obtain low frequency reconstructed seismic data in the space-time window.

15. The medium of claim 13 wherein reconstructing seismic data in the low frequency band comprises:
- for each location of a sliding space-time window of the seismic data,
  - transforming seismic data in the space-time window from the space-time domain to an intermediate domain, wherein the intermediate domain is one of a frequency-slowness domain, a frequency-velocity domain, and a frequency-wavenumber domain, and
  - for each trace in the intermediate domain,
    - detecting amplitudes with frequencies in the low frequency band,
    - reconstructing the amplitudes in the low frequency band to obtain a low frequency reconstructed trace using an autoregressive model, and replacing the trace with the low frequency reconstructed trace.

16. The medium of claim 13 wherein reconstructing seismic data in the low frequency band comprises:
transforming the seismic data from the time domain to obtain transformed seismic data an intermediate domain, wherein the intermediate domain is one of a frequency-slowness domain, a frequency-velocity domain, and a frequency-wavenumber domain;
detecting amplitudes of the transformed seismic data with frequencies in a low frequency band;
reconstructing amplitudes of traces in the low frequency band of the intermediate domain using an autoregressive model to obtain low frequency reconstructed seismic data in the intermediate domain; and
inverse transforming the low frequency reconstructed seismic data in the space time domain.

17. The medium of claim 13 wherein constructing the velocity model of the subterranean formation based on the low frequency reconstructed seismic data comprises performing full-waveform inversion with the low frequency reconstructed seismic data to obtain the velocity model free of contamination from the low frequency noise.

18. Apparatus for generating an image of a subterranean formation from seismic data recorded in a seismic survey of the subterranean formation, the apparatus comprising:
means for reconstructing seismic data in a low frequency band of the seismic data from signals in the seismic data with relatively higher frequencies than the low frequency band to obtain low frequency reconstructed seismic data that is free of low frequency noise in the low frequency band;
means for constructing a velocity model of the subterranean formation based on the low frequency reconstructed seismic data; and
means for generating the image of the subterranean formation based on the velocity model and the low frequency reconstructed seismic data.

19. The apparatus of claim 18 wherein means for reconstructing seismic data in the low frequency band comprises:
for each location of a sliding space-time window of the seismic data,
transforms seismic data in the space-time window from the space-time domain to an intermediate domain, wherein the intermediate domain is one of a frequency-slowness domain, a frequency-velocity domain, and a frequency-wavenumber domain,
uses an autoregressive model to reconstruct seismic data in the low frequency band of each trace in the intermediate domain, and
transforms the low frequency reconstructed traces to the space-time domain to obtain low frequency reconstructed seismic data in the space-time window.

20. The apparatus of claim 18 wherein means for reconstructing seismic data in the low frequency band comprises:
for each location of a sliding space-time window of the seismic data,
transforms seismic data in the space-time window from the space-time domain to an intermediate domain, wherein the intermediate domain is one of a frequency-slowness domain, a frequency-velocity domain, and a frequency-wavenumber domain, and
for each trace in the intermediate domain,
detects amplitudes with frequencies in the low frequency band,
reconstructs the amplitudes in the low frequency band to obtain a low frequency reconstructed trace using an autoregressive model, and
replaces the trace with the low frequency reconstructed trace.

21. The apparatus of claim 18 wherein means for reconstructing seismic data in the low frequency band comprises:
transforms the seismic data from the time domain to obtain transformed seismic data an intermediate domain, wherein the intermediate domain is one of a frequency-slowness domain, a frequency-velocity domain, and a frequency-wavenumber domain;
detects amplitudes of the transformed seismic data with frequencies in a low frequency band;
reconstructs amplitudes of traces in the low frequency band of the intermediate domain using an autoregressive model to obtain low frequency reconstructed seismic data in the intermediate domain; and
inverse transforms the low frequency reconstructed seismic data in the space time domain.

22. The apparatus of claim 18 wherein constructing the velocity model of the subterranean formation based on the low frequency reconstructed seismic data comprises performing full-waveform inversion with the low frequency reconstructed seismic data to obtain the velocity model free of contamination from the low frequency noise.

23. A method for manufacturing a geophysical data product, the method comprising:
reconstructing seismic data in a low frequency band of the seismic data from signals in the seismic data with relatively higher frequencies than the low frequency band using an autoregression model to obtain low frequency reconstructed seismic data that is free of low frequency noise in the low frequency band;
constructing a velocity model of a subterranean formation based on the low frequency reconstructed seismic data;
generating an image of the subterranean formation based on the velocity model and the low frequency reconstructed seismic data; and
storing the velocity model and the image in a computer-readable medium.

* * * * *